(12) United States Patent
Phillips et al.

(10) Patent No.: US 10,179,329 B2
(45) Date of Patent: Jan. 15, 2019

(54) COMBINING SCR WITH PNA FOR LOW TEMPERATURE EMISSION CONTROL

(71) Applicant: Johnson Matthey Public Limited Company, London (GB)

(72) Inventors: Paul Richard Phillips, Royston (GB); Guy Richard Chandler, Cambridge (GB); Alexander Nicholas Michael Green, Baldock (GB); Matthew Eben Harris, Royston (GB); James Alexander Wylie, Royston (GB); Miroslaw Gall, Royston (GB); Garry Adam Burgess, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/944,273

(22) Filed: Nov. 18, 2015

(65) Prior Publication Data

US 2016/0136626 A1    May 19, 2016

Related U.S. Application Data

(60) Provisional application No. 62/081,894, filed on Nov. 19, 2014.

(51) Int. Cl.
*B01J 21/04*    (2006.01)
*B01J 21/06*    (2006.01)
(Continued)

(52) U.S. Cl.
CPC ........ *B01J 29/763* (2013.01); *B01D 53/9418* (2013.01); *B01D 53/9422* (2013.01);
(Continued)

(58) Field of Classification Search
CPC . B01J 21/04; B01J 21/06; B01J 21/063; B01J 21/066; B01J 21/08; B01J 21/12;
(Continued)

(56) References Cited

U.S. PATENT DOCUMENTS 4,010,238 A    3/1977  Shiraishi et al.
4,085,193 A    4/1978  Nakajima et al.
(Continued)

FOREIGN PATENT DOCUMENTS

DE    10054877 A1    5/2005
EP     1027919 A2    8/2000
(Continued)

*Primary Examiner* — Cam N. Nguyen

(57) ABSTRACT

A catalyst article comprises an SCR catalyst and a NOx adsorber catalyst, where each of these catalysts comprise a metal molecular sieve, each with a different metal. The catalyst article can be close coupled with other components to give a $NO_X$ performance advantage from cold start to a combined DOC and SCRF system. Higher $NO_X$ conversion is also shown in under-floor location due to NOx storage before SCR light off and selective $NH_3$ slip control, allowing higher NH3 fill levels. Systems comprising the catalyst article and methods of using the catalyst article to give improved hydrocarbon and carbon monoxide control, as well as ammonia slip control, are described. The systems can include flow-through or wall-flow monoliths.

25 Claims, 11 Drawing Sheets

(51) Int. Cl.
  *B01J 21/08* (2006.01)
  *B01J 21/12* (2006.01)
  *B01J 23/10* (2006.01)
  *B01J 23/44* (2006.01)
  *B01J 23/56* (2006.01)
  *B01J 23/63* (2006.01)
  *B01J 23/66* (2006.01)
  *B01J 23/70* (2006.01)
  *B01J 23/72* (2006.01)
  *B01J 23/76* (2006.01)
  *B01J 23/83* (2006.01)
  *B01J 23/84* (2006.01)
  *B01J 23/89* (2006.01)
  *B01J 29/00* (2006.01)
  *B01D 53/94* (2006.01)
  *B01J 29/76* (2006.01)
  *B01J 29/74* (2006.01)

(52) U.S. Cl.
  CPC ..... *B01D 53/9468* (2013.01); *B01D 53/9477* (2013.01); *B01J 29/743* (2013.01); *B01D 2251/2062* (2013.01); *B01D 2255/1021* (2013.01); *B01D 2255/1023* (2013.01); *B01D 2255/2065* (2013.01); *B01D 2255/20761* (2013.01); *B01D 2255/50* (2013.01); *B01D 2255/91* (2013.01); *B01D 2257/404* (2013.01); *B01D 2258/012* (2013.01); *Y02A 50/2325* (2018.01)

(58) Field of Classification Search
  CPC ... B01J 23/10; B01J 23/44; B01J 23/56; B01J 23/63; B01J 23/66; B01J 23/70; B01J 23/72; B01J 23/76; B01J 23/83; B01J 23/84; B01J 23/89; B01J 23/8926; B01J 29/00; B01D 53/9418; B01D 53/9422; B01D 53/9468; B01D 53/9477
  USPC ............ 502/66, 74, 262, 303–304, 326–339, 502/345–351, 353–355, 439
  See application file for complete search history.

(56) References Cited

U.S. PATENT DOCUMENTS

| | | | | |
|---|---|---|---|---|
| 7,062,904 B1* | 6/2006 | Hu | ............. | F01N 3/035 60/274 |
| 7,213,395 B2* | 5/2007 | Hu | ............. | F01N 13/011 423/239.1 |
| 7,251,929 B2* | 8/2007 | Hu | ............. | F01N 13/0097 60/285 |
| 7,332,135 B2* | 2/2008 | Gandhi | ............. | B01D 53/8631 422/171 |
| 7,334,400 B2* | 2/2008 | Yan | ............. | F01N 13/011 423/239.1 |
| 7,628,009 B2* | 12/2009 | Hu | ............. | F02D 41/0215 477/100 |
| 7,650,746 B2* | 1/2010 | Hu | ............. | F01N 13/011 423/239.1 |
| 7,674,743 B2* | 3/2010 | Gandhi | ............. | B01D 53/8631 423/213.2 |
| 7,685,813 B2* | 3/2010 | McCarthy, Jr. | ............. | F01N 3/0842 60/274 |
| 7,902,107 B2* | 3/2011 | Patchett | ............. | B01D 5/0054 502/527.24 |
| 7,947,238 B2* | 5/2011 | Deeba | ............. | B01D 53/944 423/213.2 |
| 8,037,674 B2* | 10/2011 | Kupe | ............. | F01N 13/011 60/286 |
| 8,101,146 B2* | 1/2012 | Fedeyko | ............. | B01D 53/9436 422/169 |
| 8,105,559 B2* | 1/2012 | Melville | ............. | B01D 53/9409 423/239.1 |
| 8,246,922 B2* | 8/2012 | Boorse | ............. | B01D 53/9445 422/170 |
| 8,252,258 B2* | 8/2012 | Muller-Stach | ....... | B01D 53/944 423/213.2 |
| 8,557,203 B2* | 10/2013 | Bailey | ............. | B01D 53/944 422/170 |
| 8,663,587 B2* | 3/2014 | Boorse | ............. | B01D 53/9431 422/171 |
| 8,734,743 B2* | 5/2014 | Muller-Stach et al. ...................... B01D 53/945 422/170 |
| 9,034,269 B2* | 5/2015 | Hilgendorff | ......... | B01J 37/0244 422/170 |
| 9,138,725 B2* | 9/2015 | Hoke | ............. | B01J 23/63 |
| 9,227,176 B2* | 1/2016 | Andersen | ............. | B01J 37/0244 |
| 9,440,192 B2* | 9/2016 | Hoke | ............. | B01D 53/945 |
| 9,579,603 B2* | 2/2017 | Sonntag | ............. | B01J 35/0006 |
| 9,579,638 B2* | 2/2017 | Fedeyko | ............. | B01D 53/8628 |
| 9,649,596 B2* | 5/2017 | Chang | ............. | B01D 53/9418 |
| 9,757,718 B2* | 9/2017 | Fedeyko | ............. | B01J 29/763 |
| 2004/0175315 A1 | 9/2004 | Brisley et al. | | |
| 2006/0010857 A1* | 1/2006 | Hu | ............. | F01N 13/011 60/286 |
| 2006/0179825 A1* | 8/2006 | Hu | ............. | B01D 46/0036 60/297 |
| 2007/0012032 A1 | 1/2007 | Hu | | |
| 2007/0079602 A1* | 4/2007 | Hu | ............. | F01N 13/0097 60/286 |
| 2009/0317307 A1 | 12/2009 | Kanazawa | | |
| 2011/0047970 A1* | 3/2011 | Yezerets | ............. | F01N 3/0842 60/274 |
| 2011/0274606 A1 | 11/2011 | Melville et al. | | |
| 2012/0141347 A1 | 6/2012 | Collier et al. | | |
| 2012/0328499 A1 | 12/2012 | Ando et al. | | |
| 2013/0019589 A1* | 1/2013 | Kim | ............. | B01D 53/9477 60/297 |
| 2013/0084222 A1 | 4/2013 | Grubert et al. | | |
| 2013/0136677 A1 | 5/2013 | Chandler et al. | | |
| 2014/0234190 A1 | 8/2014 | McKenna | | |
| 2015/0011377 A1* | 1/2015 | Patchett | ............. | B01D 5/0054 502/60 |
| 2015/0031526 A1* | 1/2015 | Micallef | ............. | B01J 38/02 502/61 |
| 2015/0037233 A1* | 2/2015 | Fedeyko | ............. | B01D 53/8628 423/239.1 |
| 2015/0118121 A1* | 4/2015 | Chen | ............. | B01D 53/9418 422/180 |
| 2015/0165422 A1* | 6/2015 | Sung | ............. | B01J 29/076 423/213.5 |
| 2015/0165423 A1* | 6/2015 | Sung | ............. | B01J 29/076 423/213.5 |
| 2015/0224486 A1* | 8/2015 | Bauer | ............. | B01J 37/0246 423/213.5 |
| 2015/0238947 A1* | 8/2015 | Casci | ............. | B01D 53/9418 502/66 |
| 2015/0321184 A1* | 11/2015 | Fedeyko | ............. | B01J 21/08 423/239.1 |
| 2015/0352492 A1* | 12/2015 | Andersen | ............. | B01D 53/8634 423/237 |
| 2016/0001228 A1* | 1/2016 | Chang | ............. | B01D 53/9418 423/213.5 |
| 2016/0008759 A1* | 1/2016 | Sonntag | ............. | B01J 35/04 423/239.1 |
| 2016/0045868 A1* | 2/2016 | Sonntag | ............. | B01J 35/0006 423/213.2 |
| 2016/0101413 A1* | 4/2016 | Fedeyko | ............. | B01D 53/9436 422/171 |
| 2016/0121317 A1* | 5/2016 | Casci | ............. | C01B 39/10 502/66 |
| 2016/0175823 A1* | 6/2016 | Patchett | ............. | B01D 5/0054 422/171 |
| 2016/0339389 A1* | 11/2016 | Hoke | ............. | B01D 53/945 |

(56) References Cited

U.S. PATENT DOCUMENTS

2017/0128922 A1* 5/2017 Chen .................... B01D 53/945
2017/0189854 A1* 7/2017 Andersen ........... B01D 53/8628

FOREIGN PATENT DOCUMENTS

EP      1203611 A1    5/2002
WO   2012170421 A1  12/2012

* cited by examiner

COMBINING SCR WITH PNA FOR LOW TEMPERATURE EMISSION CONTROL

CROSS-REFERENCE TO RELATED APPLICATIONS

This application claims priority to U.S. Provisional Patent Application No. 62/081,894, filed on Nov. 19, 2014, and is incorporated herein by reference.

FIELD OF THE INVENTION

The present invention is directed towards the use of catalytic articles comprising a selective catalytic reduction (SCR) catalyst and a passive $NO_X$ adsorber catalyst. These catalysts can be arranged in a layered system with a bottom layer comprising palladium on ceria or a metal zeolite acting as a $NO_X$ adsorber catalyst and which can also provide ammonia slip control as well as hydrocarbon (HC) and carbon monoxide (CO) conversion and the top layer containing the SCR catalyst. Alternatively these catalysts can be zoned or can be combined in a single washcoat.

BACKGROUND OF THE INVENTION

Combustion of hydrocarbon-based fuel in engines produces exhaust gas that contains, in large part, relatively benign nitrogen ($N_2$), water vapor ($H_2O$), and carbon dioxide ($CO_2$). But the exhaust gases also contains, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of flue and exhaust gas released into the atmosphere, it is desirable to eliminate or reduce the amount of the undesirable components, preferably by a process that, in turn, does not generate other noxious or toxic substances.

Typically exhaust gases from lean burn gas engines have a net oxidizing effect due to the high proportion of oxygen that is provided to ensure adequate combustion of the hydrocarbon fuel. In such gases, one of the most burdensome components to remove is $NO_x$, which includes nitric oxide (NO) and nitrogen dioxide ($NO_2$). The reduction of $NO_x$ to $N_2$ is particularly problematic because the exhaust gas contains enough oxygen to favor oxidative reactions instead of reduction. Notwithstanding, $NO_x$ can be reduced by a process commonly known as Selective Catalytic Reduction (SCR). An SCR process involves the conversion of $NO_x$, in the presence of a catalyst and with the aid of a nitrogenous reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is adsorbed onto the catalyst and the $NO_x$ reduction reaction takes place as the gases pass through or over the catalyzed substrate. The chemical equation for stoichiometric SCR reactions using ammonia is:

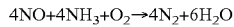

$$4NO + 4NH_3 + O_2 \rightarrow 4N_2 + 6H_2O$$

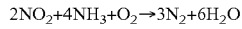

$$2NO_2 + 4NH_3 + O_2 \rightarrow 3N_2 + 6H_2O$$

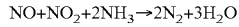

$$NO + NO_2 + 2NH_3 \rightarrow 2N_2 + 3H_2O$$

$NH_3$ SCR Emission control systems are very efficient once they reach their operating temperature (typically, 200° C. and higher). However, these systems are relatively inefficient below their operating temperature (the "cold start" period). For instance, current urea based selective catalytic reduction (SCR) applications implemented for meeting Euro 6 emissions require that the temperature at the urea dosing position be above about 180° C. before urea can be dosed and used to convert $NO_x$. $NO_x$ conversion below 180° C. is difficult to address using the current systems, and future European and US legislation will stress the low temperature $NO_x$ conversion. Although the SCR catalyst is promoted by the presence of $NO_2$, there is limited $NO_2$ present at low temperature either due to the low NO oxidation activity of the DOC or any engine-out $NO_2$ is reduced to NO by HC or CO on the DOC, such that preSCR NOx is predominantly present as NO. The low temperature $NO_X$ emission can be controlled by heating strategies but this has a detrimental effect of $CO_2$ emissions. As even more stringent national and regional legislation lowers the amount of pollutants that can be emitted from diesel engines, reducing emissions during the cold start period is becoming a major challenge. Thus, methods for reducing the level of $NO_x$ emitted during cold start condition continue to be explored. The present invention addresses this issue by combining a passive $NO_X$ adsorber catalyst which can trap $NO_X$ at low temperature with a $NH_3$ SCR catalyst. The PNA can provide the additional benefit of controlling any $NH_3$ slip as well as CO and HC emission.

SUMMARY OF THE INVENTION

In one aspect of the invention, a catalyst article comprises an SCR catalyst and a NOx adsorber catalyst, wherein the NOx adsorber catalyst comprises palladium on ceria or a metal-containing molecular sieve, wherein the metal is selected from the group consisting of cerium, chromium, cobalt, copper, iron, lanthanum, manganese, molybdenum, nickel, niobium, palladium, silver, tungsten, vanadium, and zinc, and mixtures thereof.

In another aspect of the invention, the catalyst article comprises (a) a first layer comprising the SCR catalyst and a second layer comprising the NOx adsorber catalyst, or (b) a first layer comprising the NOx adsorber catalyst and a second layer comprising the SCR catalyst, where the layers are present as either overlayer and an underlayer or as two adjacent layers and the first layer contacts the flow of exhaust gas before the second layer.

In still another aspect of the invention, a catalyst article comprises an SCR catalyst and a NOx adsorber catalyst, where the molecular sieve in the NOx adsorber catalyst is the same as the molecular sieve in a metal-containing molecular sieve in the SCR catalyst, and the metal in the NOx adsorber catalyst and the metal in the SCR catalyst are in combination with the molecular sieve.

In a further aspect of the invention, a catalyst article comprises an SCR catalyst and a NOx adsorber catalyst, where the molecular sieve in the NOx adsorber catalyst is different than the molecular sieve in a metal-containing molecular sieve in the SCR catalyst, the metal in the NOx adsorber catalyst is in a first combination with the molecular sieve in the NOx adsorber catalyst, the metal in the SCR catalyst is in a second combination with the molecular sieve in the SCR catalyst and the first combination and the second combination are present in a third combination.

In yet another aspect of the invention, a catalyst article comprising an SCR catalyst and a NOx adsorber catalyst can further comprise a flow-through substrate or a wall-flow filter. When the catalyst article comprises a flow-through substrate and the first layer is a coating on an upstream portion of the substrate and second layer is coated on a downstream portion of the substrate, the SCR catalyst can be disposed on the flow-through substrate in a downstream portion of the substrate and the NOx adsorber catalyst can be disposed on the flow-through substrate in an upstream portion of the substrate. When the catalyst article comprises a wall-flow filter, a first layer, comprising an SCR catalyst, can be a coating on an outlet side of the filter and second layer, comprising a NOx adsorber catalyst, can be a coating on an inlet side of the filter.

In yet another aspect of the invention, a catalyst article comprises: an extruded monolith substrate, wherein: (a) the extruded substrate comprises the SCR catalyst and the NOx adsorber catalyst is disposed on the extruded substrate as a layer; or (b) the extruded substrate comprises the NOx adsorber catalyst and the SCR catalyst is disposed on the extruded substrate as a layer; or (c) the extruded substrate comprises the SCR catalyst and the NOx adsorber catalyst.

In a further aspect of the invention, a catalytic washcoat comprises an SCR catalyst, a NOx adsorber catalyst and at least one binder, wherein the SCR catalyst comprises a metal selected from the group consisting of cerium, chromium, cobalt, copper, gallium, indium, iridium, iron, manganese, molybdenum, nickel, palladium, platinum, ruthenium, rhenium, silver, tin and zinc; the NOx adsorber catalyst comprises a molecular sieve and a metal selected from the group consisting of cerium, cobalt, iron, lanthanum, manganese, molybdenum, niobium, palladium, tungsten, silver and zinc, wherein: (a) the metal in the SCR catalyst and the metal in the NOx adsorbed catalyst are different, or (b) the metal in the SCR catalyst and the metal in the NOx adsorbed catalyst is the same and either (i) only the NOx adsorbed catalyst comprises a molecular sieve, or (ii) the molecular sieve in the SCR catalyst is different than the molecular sieve in the NOx adsorbed catalyst, and the at least one binder is selected from the group consisting of alumina, silica, non-zeolite silica-alumina, natural clay, $TiO_2$, $ZrO_2$ and $SnO_2$.

In another aspect of the invention, an exhaust system comprises a catalyst article comprises an SCR catalyst and a NOx adsorber catalyst and a close coupled catalyzed soot filter (CSF), wherein the NOx adsorber catalyst comprises palladium on ceria or a metal selected from the group consisting of cerium, cobalt, iron, lanthanum, manganese, molybdenum, niobium, palladium, tungsten, silver and zinc dispersed on a molecular sieve. The catalyzed soot filter can be positioned either downstream or upstream of the catalyst article in the flow of the exhaust gas.

In yet another aspect of the invention, a method for producing an ammonia slip catalyst comprises: (a) forming a bottom layer on a substrate by applying onto a substrate a bottom layer washcoat comprising a NOx adsorber catalyst comprising a metal selected from the group consisting of cerium, cobalt, iron, lanthanum, manganese, molybdenum, niobium, palladium, tungsten, silver and zinc dispersed on a molecular sieve; (b) drying the bottom layer washcoat on the substrate, (c) calcining the bottom layer washcoat on the substrate; (d) forming a top layer positioned over the bottom layer by applying a top layer washcoat comprising an SCR catalyst over the calcined bottom layer formed in step (c), (e) drying the top layer washcoat on the calcined bottom layer on the substrate, and (f) calcining the top layer washcoat on the bottom layer washcoat on the substrate. In another aspect of the invention, a method for producing an ammonia slip catalyst comprises the same steps except that the SCR catalyst is placed in the bottom layer and the NOx adsorber catalyst is placed in the top layer.

In yet another aspect of the invention, a method for treating an exhaust gas comprises contacting an exhaust gas stream having a concentration of NOx with a nitrogenous reductant at a temperature of about 150° C. to about 750° C. in the presence of a catalyst article comprising: (a) a wall flow monolith having an inlet face end and an outlet face and an axis of gas flow from the inlet face to the outlet face; (b) a composition comprising a first layer comprising an SCR catalyst and a second layer comprising a NOx trap catalyst comprising palladium on ceria or a metal-containing molecular sieve, where the metal is selected from the group consisting of cerium, cobalt, iron, lanthanum, manganese, molybdenum, niobium, palladium, tungsten, silver and zinc, wherein the first layer is arranged to contact an exhaust gas before the second layer and (c) optionally a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and the second zone is disposed proximal to the outlet face.

In yet another aspect of the invention, a method for reducing the concentration of one or more of ammonia, NOx, carbon monoxide and hydrocarbons in an exhaust gas stream comprises contacting an exhaust gas stream containing ammonia, NOx, carbon monoxide and/or hydrocarbons with an ammonia slip catalyst comprising a first layer comprising an SCR catalyst and a second layer comprising a NOx adsorber catalyst comprising palladium on ceria or a metal-containing molecular sieve, wherein the metal is selected from the group consisting of cerium, cobalt, iron, lanthanum, manganese, molybdenum, niobium, palladium, tungsten, silver and zinc, wherein the first layer is arranged to contact an exhaust gas before the second layer. The SCR catalyst and the NOx adsorber catalyst can be positioned in a flow-through substrate or a wall-flow filter. In still another aspect of the invention, a method for reducing the concentration of one or more of ammonia, carbon monoxide and hydrocarbons in an exhaust gas stream comprises the step described above, except that the orientation of the first and second layers are such that the second layer is arranged to contact an exhaust gas before the first layer.

In another aspect of the invention, methods for reducing at least one of ammonia, NOx, CO and hydrocarbons in an exhaust gas comprise contacting the gas with a catalyst article comprising: (a) a wall flow monolith having an inlet face end and an outlet face and an axis of gas flow from said inlet face to said outlet face; (b) a first layer comprising a first SCR catalyst and a second layer comprising a NOx adsorber catalyst comprising palladium on ceria or a metal-containing molecular sieve, wherein the metal is selected from the group consisting of cerium, cobalt, iron, lanthanum, manganese, molybdenum, niobium, palladium, tungsten, silver and zinc, wherein the second layer is arranged to contact an exhaust gas before the first layer and optionally, (c) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and the second zone is disposed proximal to the outlet face for a time and temperature sufficient to reduce the level of at least one of ammonia, NOx, CO and hydrocarbons in the gas.

In another aspect of the invention, a method for reducing the concentration of at least one of ammonia, NOx, CO and THC in an exhaust gas stream comprises contacting an exhaust gas stream containing ammonia, NOx, CO and THC with a catalyst article as described herein for a time and temperature sufficient to reduce the level of at least one of ammonia, NOx, CO and THC in the gas.

In yet another aspect of the invention, a method for reducing the concentration of NOx in an exhaust gas stream during the cold start of the engine comprises contacting an exhaust gas stream containing NOx with a catalyst article described herein, wherein stored NOx is reduced by hydrocarbon SCR.

In still another aspect of the invention, an ammonia slip catalyst comprises an inlet zone and an outlet zone, wherein an SCR catalyst is positioned within the inlet zone and a NOx adsorber catalyst is positioned within the outlet zone, wherein the NOx adsorber catalyst comprises a metal-containing molecular sieve wherein the metal is selected from the group consisting of cerium, cobalt, iron, lanthanum, manganese, molybdenum, niobium, palladium, tungsten, silver and zinc, wherein at least one of the SCR catalyst and the NOx adsorber catalyst are positioned on a wall-flow filter.

In another aspect of the invention, a catalyst article comprises an SCR catalyst and a NOx adsorber catalyst, wherein the SCR catalyst comprises a metal-containing molecular sieve, wherein the metal is selected from the group consisting of cerium, copper, iron, and manganese, and mixtures thereof, and the NOx adsorber catalyst comprises a metal-containing molecular sieve, wherein the metal is selected from the group consisting of palladium or silver, and mixtures thereof, wherein the SCR catalyst and the NOx adsorber catalyst comprise the same molecular sieve and both the metal of the SCR catalyst and the metal of NOx adsorber catalyst are exchanged and/or substituted in the molecular sieve.

In still another aspect of the invention, a method of preparing a catalyst article comprising an SCR catalyst and a NOx adsorber catalyst as described herein comprises: (a) adding a first metal selected from the group selected from the group consisting of cerium, copper, iron, and manganese, and mixtures thereof, to a molecular sieve to form a molecular sieve containing the first metal; (b) calcining the molecular sieve containing the first metal to form a first calcined molecular sieve; (c) adding a second metal selected from the group selected from the group consisting of palladium or silver, and mixtures thereof, to the first calcined molecular sieve to form a molecular sieve containing the first metal and the second metal; and (d) calcining the molecular sieve containing the first metal and the second metal.

In yet another aspect of the invention, a method for reducing the concentration of NOx in an exhaust gas stream during the cold start of the engine comprises contacting an exhaust gas stream containing NOx with a catalyst article comprising an SCR catalyst and a NOx adsorber catalyst as described herein, storing NOx in the catalyst article during cold engine startup, and reducing stored NOx by hydrocarbon SCR.

BRIEF DESCRIPTION OF THE DRAWINGS

The invention may be understood from the following detailed description when read in connection with the accompanying drawing.

DETAILED DESCRIPTION OF THE INVENTION

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins ISBN 0-9678550-9-8. doi: 10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

Figure 1:
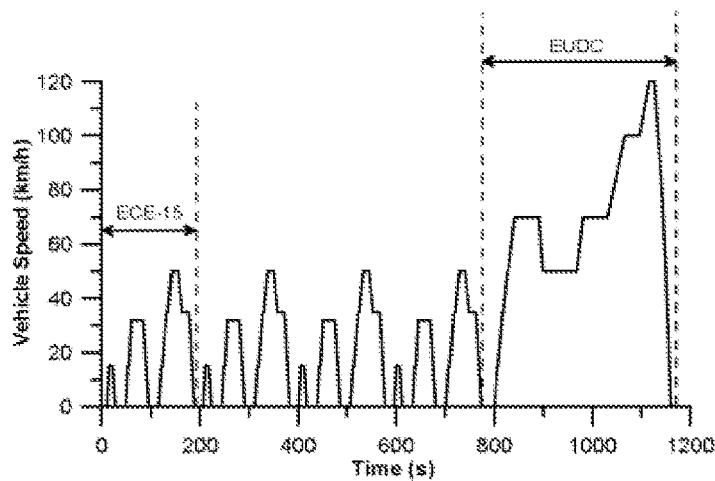
FIG. 1 is a graph illustrating the MVEG test protocol.

MVEG (Motor Vehicle Emissions Group) is a test protocol for emissions testing from vehicles using the ECE+EUDC Test Cycle. The procedure is performed as described in EEC Directive 90/C81/01, and comprises four ECE segments repeated without interruption followed by one EUDC (European Urban Driving Cycle segment. A graph showing the vehicle speed of a vehicle over time when being evaluated under this protocol is shown in FIG. 1.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The inventions relate to the finding that a combination of an SCR catalyst with a NOx adsorber catalyst underlayer, in orientations described herein, provides significant hydrocarbon and carbon dioxide conversion and provide the additional benefit of NOx storage during cold starting of engines, as shown in MVEG test cycles. The NOx adsorber catalyst comprises palladium on ceria or a metal-containing molecular sieve, wherein the metal is selected from a specific group of metals. A risk in using close-coupled SCR systems is that HC/CO conversion will decrease due to the cooler downstream location of the oxidation catalyst on a higher thermal mass substrate, such as a filter. NOx removal before start of dosing/SCR light-off is also required. The inventions described herein relate to the finding that during the cold start phase, hydrocarbons are reduced by the combination of an SCR catalyst with a NOx adsorber catalyst underlayer as described herein. This system provides a NOx performance advantage over a DOC+SCRF system. The NOx adsorber underlayer also provides $NH_3$ slip control, without affecting the on cycle NOx conversion. The use of the SCR with NOx adsorber underlayer also provides benefits for SCR in the remote under-floor location downstream of DOC/CSF, with NOx storage at low temperature before SCR light-off and reductant dosing, and $NH_3$ slip control enabling operation at higher $NH_3$ fill levels to allow maximum NOx conversion.

The NOx adsorbing underlayer can also be used to enable integrated $NH_3$ slip control within SCR on filter (SCRF). The NOx adsorber component, coated in the outlet channels, would provide $NH_3$ slip control, as well as additional HC/CO conversion, without negatively impacting NOx conversion.

The combination of the SCR and NOx adsorber catalysts as described herein, in addition to providing increased HC, CO and NOx removal and selective $NH_3$ slip functionality, reduces the requirement for performance of downstream oxidation coatings. There will also be a benefit for SCR downstream of DOC/CSF or SCRF by providing NOx storage as NO at low temperature (from key on to ~180° C.) before SCR light-off and reductant dosing. Low temperature NOx storage is important, as for temperatures below CSF NO and HC oxidation light-off, engine-out $NO_2$ reacts with HC on DOC, such that pre SCR NOx is predominantly NO. The NOx adsorber underlayer provides $NH_3$ slip control enabling SCR operation at higher $NH_3$ fill levels to give higher NOx conversion, particularly under low temperature, low $NO_2$ conditions.

A catalyst article comprises an SCR catalyst and a NOx adsorber catalyst, where the NOx adsorber catalyst comprises a metal-containing molecular sieve, where the metal is selected from the group consisting of cerium, cobalt, iron, lanthanum, manganese, molybdenum, niobium, palladium, tungsten, silver and zinc, and, when the SCR catalyst comprises a metal, the metal in the NOx adsorber catalyst and the metal in the SCR catalyst are different metals.

Catalysts

SCR Catalyst

The SCR catalyst can comprise a base metal, an oxide of a base metal, a metal supported on a mixed oxide, a molecular sieve, a metal-containing molecular sieve or a mixture thereof. The base metal can be selected from the group consisting of cerium (Ce), chromium (Cr), cobalt (Co), copper (Cu), iron (Fe), manganese (Mn), molybdenum (Mo), nickel (Ni), tungsten (W), and vanadium (V), and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, of which the entire contents are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively.

The SCR catalyst can comprise vanadium, niobium, tantalum and/or tungsten doped on ceria. Preferably vanadium, niobium, tantalum and/or tungsten is present at from 0.1 to 9 wt. % on the ceria and ceria is present in at least 91 wt. % of the vanadium, niobium, tantalum and/or tungsten doped ceria.

The SCR catalyst can comprise a metal supported on a mixed oxide comprises at least one catalytic component consisting of (i) at least one transition metal dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, wherein at least one transition metal is dispersed thereon, wherein the at least one transition metal is selected from the group consisting of a Group VIB metal, a Group IB metal, a Group IVA metal, a Group VB metal, a Group VIIB metal, a Group VIII metal and mixtures of any two or more thereof, provided that at least one selected transition metal is tungsten, provided that the content of cerium and zirconium as oxides in the catalytic component is $Ce_xZr_{(1-x)}O_2$, wherein X=0.1-0.9, preferably X=0.2-0.5. This type of SCR catalyst is described in U. S. Patent Application Publication No. 2012/0141347, the entire contents are incorporated herein by reference.

The SCR catalyst can comprise a molecular sieve or a metal-containing molecular sieve. As is used herein "metal-containing molecular sieve" means a metal exchanged or metal substituted molecular sieve. The SCR catalyst can comprise an aluminosilicate molecular sieve, an aluminophosphate molecular sieve, a silicoaluminophosphate molecular sieve, a metal-containing aluminosilicate molecular sieve, a metal-containing aluminophosphate molecular sieve, or a metal-containing silicoaluminophosphate molecular sieve. Preferably, the molecular sieve is a metal-containing molecular sieve. As used herein, the term molecular sieve comprises molecular sieves made of the following materials: aluminosilicates, metal-containing aluminosilicates, aluminophosphates (AlPO), metal-containing aluminophosphates (MeAlPO), silico-aluminophosphates (SAPO), and metal-containing silico-aluminophosphates (MeAPSO) molecular sieves. This term includes traditional zeolitic molecular sieves, which had been limited to being a microporous aluminosilicate having any one of the framework structures listed in the Database of Zeolite Structures published by the International Zeolite Association (IZA). One of ordinary skill in the art would recognize that the other families described above are also considered to be zeolites by those in the art.

The SCR catalyst can comprise a small pore, medium pore or large pore molecular sieve, or combinations thereof. A small pore molecular sieve contains channels defined by up to eight tetrahedral atoms. A medium pore molecular sieve contains channels defined by ten-membered rings. A large pore molecular sieve contains channels defined by twelve-membered rings.

The SCR catalyst can comprise a small pore molecular sieve selected from the group consisting of aluminosilicate molecular sieves, metal-containing aluminosilicate molecular sieves, aluminophosphate (AlPO) molecular sieves, metal-containing aluminophosphate (MeAlPO) molecular sieves, silico-aluminophosphate (SAPO) molecular sieves, and metal-containing silico-aluminophosphate (MeAPSO) molecular sieves, and mixtures thereof. The SCR catalyst can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, ERI, SFW, KFI, DDR and ITE.

The SCR catalyst can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve is selected from the group of Framework Types consisting of FER, MEL, MFI and STT.

The SCR catalyst can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of AFI, BEA, MAZ, MOR and OFF.

The SCR catalyst can comprise a molecular sieve or a metal-containing molecular sieve where the molecular sieve or the molecular sieve in the metal-containing molecular sieve comprises a Framework Type selected from the group consisting of: AEI, BEA (beta zeolites), CHA (Chabazite), FAU (zeolite Y), FER (ferrierite), MFI (ZSM-5) and MOR (mordenite). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

A metal-containing molecular sieve can have at least one metal from one of the groups VB, VIB, VIIB, VIIIB, IB, or JIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metal selected from the group consisting of cerium, chromium, cobalt, copper, gallium, indium, iridium, iron, manganese, molybdenum, nickel, palladium, platinum, ruthenium, rhenium, silver, tin and zinc. More preferably the metal is copper.

A metal-containing molecular sieve can contain in the range of about 0.10% and about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% and about 5% by weight. The weight % of a metal in a metal-containing molecular sieve is the weight of the metal divided by the total weight of the metal and the molecular sieve times 100.

The SCR catalyst can be present in a catalyst article at a concentration of about 0.5 to about 4.0 g/in$^3$. The amount of the SCR present in the catalyst article can depend on the type of SCR catalyst in the article. When the SCR catalyst comprises a base metal or an oxide thereof, the base metal can be present at a concentration of 0.01 to 20 wt. % based on the total weight of the SCR catalyst. When the SCR catalyst comprises a molecular sieve or a metal-containing molecular sieve, the molecular sieve can be present at a concentration of 40 to 100 wt. %, based on the total weight of the SCR catalyst.

NOx Adsorber

The NOx adsorber comprises palladium on ceria or a metal-containing molecular sieve, wherein the metal is selected from the group consisting of cerium, chromium, cobalt, copper, iron, lanthanum, manganese, molybdenum, nickel, niobium, palladium, tungsten, silver vanadium, and zinc, and mixtures thereof. Preferably the metal is cobalt, manganese, palladium, or zinc. More preferably the metal is palladium or zinc. Most preferably, the metal in the SCR catalyst is copper and the metal in the NOx adsorber catalyst is palladium. The molecular sieve in the metal-containing molecular sieve in the NOx adsorber catalyst can comprise an aluminosilicate, an aluminophosphate, or a silicoaluminophosphate, as described above in the description of molecular sieves in SCR catalysts. When the SCR catalyst comprises a metal-containing molecular sieve, the molecular sieve in the metal-containing molecular sieve in the SCR catalyst can be the same molecular sieve in the metal-containing molecular sieve in the NOx adsorber catalyst, or the molecular sieve in the metal-containing molecular sieve in the SCR catalyst can be the different than the molecular sieve in the metal-containing molecular sieve in the NOx adsorber catalyst.

The molecular sieve in the metal-containing molecular sieve in the NOx adsorber catalyst can be a small-pore, a medium-pore or a large-pore molecular sieve, as described above in the SCR catalyst. The molecular sieve in the metal-containing molecular sieve in the NOx adsorber catalyst is preferably a small pore molecular sieve, as described above in the SCR catalyst. The small pore molecular sieve can comprise a Framework Type selected from the group consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures or intergrowths thereof. Preferably the small pore molecular sieve is a chabazite (CHA) or an AEI. Preferred medium pore molecular sieves include FER, MEL, MFI and STT. Preferred large pore molecular sieves include AFI, BEA, MAZ, MOR and OFF. Preferably the molecular sieve in the metal-containing molecular sieve comprises an aluminosilicate or an aluminophosphate having an SAR from 5 to 100, inclusive. When the palladium containing molecular sieve is a palladium containing silicoaluminophosphate, preferably the silicoaluminophosphate comprises between 5% and 15%, inclusive, of silica.

The metal in the NOx adsorber catalyst can be present at a concentration of 0.01 to 20 wt. %. The metal-containing molecular sieve can be present in the catalyst article at a concentration of about 0.5 to about 4.0 g/in$^3$.

Mixture of SCR Catalyst and $NO_X$ Adsorber Catalyst

A catalyst article can comprising an SCR catalyst and a NOx adsorber catalyst, where the SCR catalyst comprises a metal-containing molecular sieve, where the metal is selected from the group consisting of cerium, copper, iron, and manganese, and mixtures thereof, and the NOx adsorber catalyst comprises a metal-containing molecular sieve, wherein the metal is selected from the group consisting of palladium or silver, and mixtures thereof, wherein the SCR catalyst and the NOx adsorber catalyst comprise the same molecular sieve and both the metal of the SCR catalyst and the metal of NOx adsorber catalyst are exchanged and/or substituted in the molecular sieve.

The molecular sieve in the metal-containing molecular sieve in the SCR and NOx adsorber catalyst can comprise an aluminosilicate, an aluminophosphate, or a silicoaluminophosphate. The molecular sieve in the metal-containing molecular sieve in the NOx adsorber catalyst is preferably a small pore molecular sieve. Preferably the molecular sieve in the metal-containing molecular sieve in the NOx adsorber catalyst comprises a Framework Type selected from the group consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures or intergrowths thereof. More preferably, the molecular sieve comprises an AEI or CHA Framework Type.

A method of preparing a catalyst article comprising an SCR catalyst and a NOx adsorber catalyst, where the SCR catalyst comprises a metal-containing molecular sieve, where the metal is selected from the group consisting of cerium, copper, iron, and manganese, and mixtures thereof, and the NOx adsorber catalyst comprises a metal-containing molecular sieve, where the metal is selected from the group consisting of palladium or silver, and mixtures thereof, where the SCR catalyst and the NOx adsorber catalyst comprise the same molecular sieve and both the metal of the SCR catalyst and the metal of NOx adsorber catalyst are exchanged and/or substituted in the molecular sieve is described. The method comprises: (a) adding a first metal selected from the group selected from the group consisting of cerium, copper, iron, and manganese, and mixtures thereof, to a molecular sieve to form a molecular sieve containing the first metal; (b) calcining the molecular sieve containing the first metal to form a first calcined molecular sieve; (c) adding a second metal selected from the group selected from the group consisting of palladium or silver, and mixtures thereof, to the first calcined molecular sieve to form a molecular sieve containing the first metal and the second metal; and (d) calcining the molecular sieve containing the first metal and the second metal. The method can further comprise steps (a1) and (c1), where step (a1) comprises drying the molecular sieve containing the first metal and step (c1) comprises drying the molecular sieve containing the first metal and the second metal. Steps (a) and (c), adding the first and second metal, can be performed by one or more of impregnation, adsorption, ion-exchange, incipient wetness, precipitation, spray drying or the like.

A catalyst article can comprise an SCR catalyst and a NOx adsorber catalyst having the compositions described above, where: (a) when the molecular sieve in the NOx adsorber catalyst is the same as the molecular sieve in a metal-containing molecular sieve in the SCR catalyst, the metal in the NOx adsorber catalyst and the metal in the SCR catalyst are in combination with the molecular sieve or (b) when the molecular sieve in the NOx adsorber catalyst is different than the molecular sieve in a metal-containing molecular sieve in the SCR catalyst, the metal in the NOx adsorber catalyst is in a first combination with the molecular sieve in the NOx adsorber catalyst, the metal in the SCR catalyst is in a second combination with the molecular sieve in the SCR catalyst and the first combination and the second combination are present in a third combination. Preferably, the metal in the NOx adsorber catalyst is palladium. More preferably, the metal in the SCR catalyst is copper, the metal in the NOx adsorber catalyst is palladium and the molecular sieve is a chabazite or an AEI. Palladium can be in introduced into the molecular sieve by spray drying or by impregnating with Pd nitrate. The molecular sieve can be hydrothermally aged.

The catalyst article can further comprise hydrocarbon-SCR activity. The catalyst article can reduce stored NOx by hydrocarbon SCR. Preferably, the copper loading is between 0.1 and 10.0 wt. %, based on the total weight of the article. Preferably, the palladium loading is between 0.01 and 20.0 wt. %, based on the total weight of the article.

Substrate

The term "substrate" refers to a substantially inert material upon which a catalyst and optionally a support can be placed, as generally known in the art. The substrate may be of any generally suitable form. For example, the substrate may comprise a filter, a flow through monolith, such as a ceramic, honeycomb, or a different extruded structure.

The solid substrate may be any of those materials typically used for preparing exhaust gas treatment catalysts and will preferably comprise a metal or refractory ceramic having a honeycomb structure. Any suitable substrate may be employed, such as a monolithic substrate of the type having a plurality of fine, parallel gas flow passages extending there through from an inlet or an outlet face of the carrier, such that passages are open to fluid flow there through. The passages that are essentially straight paths from their fluid inlet to their fluid outlet are defined by walls on which the catalyst is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

Honeycomb substrates comprise multiple adjacent, parallel channels that generally extend from the inlet face to the outlet face of the substrate and are either open on both ends (flow-through substrates) or are capped on alternating ends in a checker-board type pattern (wall-flow filters). This geometry results in a high-surface area-to-volume ratio. Honeycomb configurations are more compact than plate types, but have higher pressure drops and plug more easily. However, for most mobile applications, preferred substrates are honeycombs. For certain applications, the honeycomb flow though monolith has a high cell density, for example about 600 to 800 cells per square inch, and/or an average internal wall thickness of about 0.18-0.35 mm, preferably about 0.20 mm to about 0.25 mm. For certain other applications, the honeycomb flow through monolith preferably has a low cell density of about 150 cells to about 600 cells per square inch, more preferably about 200 cells to about 400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite e.g. acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate. In certain embodiments, the substrate is inert.

The substrate wall of a honeycomb preferably has a porosity and pore size that is conducive for washcoating. Porosity is a measure of the percentage of void space in a porous substrate. Preferably, the porous substrate has a porosity of about 10% to about 80%, for example about 15% to about 75%, about 40% to about 65%, or from about 50% to about 60%. The pore interconnectivity, measured as a percentage of the substrate's total void volume, is the degree to which pores, void, and/or channels, are joined to form continuous paths through a porous substrate, i.e., from the inlet face to the outlet face of a filter. Preferably, the porous substrate has a pore interconnectivity volume of at least about 30%, more preferably at least about 40%.

Mean pore size of the substrate wall can be determined by any acceptable means, including by mercury porosimetry. Preferred porous substrates have a mean pore size of about 10 µm to about 40 µm, for example about 20 µm to about 30 µm, about 10 µm to about 25 µm, about 10 µm to about 20 µm, about 20 µm to about 25 µm, about 10 µm to about 15 µm, and about 15 µm to about 20 µm.

Flow-Through Monolith

The catalyst article can further comprise a flow-through monolith substrate, wherein the SCR catalyst is disposed on the flow-through monolith substrate as a first layer and the NOx adsorber catalyst is disposed on the flow-through monolith substrate as a second layer. The catalyst article can be configured such that the first layer is located upstream of the second layer in the direction of a flow of an exhaust gas through the article. The catalyst article can comprise a catalytic composition that is a mixture of the SCR catalyst and the NOx adsorber catalyst.

Filters

The catalyst article can further comprise a filter. The filter can preferably comprise silicon carbide, cordierite or aluminum titanate. The SCR catalyst can be disposed on the filter as a first layer and the NOx adsorber catalyst is disposed on the filter as a second layer. The catalyst article can be configured so that the first layer is located upstream of the second layer in the direction of a flow of an exhaust gas through the article. The catalyst article can also be configured so that the second layer is located upstream of the first layer in the direction of a flow of an exhaust gas through the article. The catalyst article can comprise one or more additional layers, where the additional layers comprise one or more additional catalyst. The SCR catalyst and the NOx adsorber catalyst can be present as a mixture on the filter. The SCR catalyst and the NOx adsorber catalyst can be present on the filter in a zoned configuration.

Extruded Substrate

The catalyst article can comprise an extruded substrate, where: (a) the extruded substrate comprises the SCR catalyst and the NOx adsorber catalyst is disposed on the extruded substrate as a layer; or (b) the extruded substrate comprises the NOx adsorber catalyst and the SCR catalyst is disposed on the extruded substrate as a layer; or (c) the extruded substrate comprises the SCR catalyst and the NOx adsorber catalyst. The extruded catalyst article can further comprise one or more additional layers, wherein the additional layers comprise one or more catalysts.

Washcoat

The term "washcoat" is a term widely recognized in the art and refers to mixture of one or more a catalyst or a catalysts precursor, support materials, and optionally other materials such as binders, promoters or stabilizers.

The catalysts of the present invention can be utilized in heterogeneous catalytic reaction systems (i.e., solid catalyst in contact with a gas reactant). To improve contact surface area, mechanical stability, and fluid flow characteristics, the catalyst components can be disposed on and/or within a substrate, for example as a coating. In certain embodiments, a washcoat containing one or more of the catalyst components is applied as a coating to an inert substrate, such as a filter, a honeycomb cordierite brick or another extruded form. The washcoat is preferably a solution, suspension, or slurry. Suitable coatings include surface coatings that cover a portion or the entire substrate, coatings that penetrate a portion of the substrate, coatings that permeate the substrate, or some combination thereof. In addition to the catalyst component, a washcoat can also include components, such as fillers, binders, stabilizers, rheology modifiers, and other additives, including one or more of alumina, silica, non-zeolite silica alumina, titania, zirconia, ceria. In certain embodiments, the washcoat comprises pore-forming agents such as graphite, cellulose, starch, polyacrylate, and polyethylene, and the like. These additional components do not necessarily catalyze the desired reaction, but instead improve the catalytic material's effectiveness, for example by increasing its operating temperature range, increasing contact surface area of the catalyst, increasing adherence of the catalyst to a substrate, modifying rheology for better processing, etc. Typically, metal oxide particles used as binders are distinguishable over metal oxide particles used as supports based on particle size, with the binder particles being significantly larger relative to support particles.

A variety of deposition methods are known in the art for depositing the catalyst on the substrate. Methods for depositing the catalyst on the substrate include, for example, disposing the catalyst in a liquid vehicle to form a slurry and wetting the substrate with the slurry by dipping the substrate into the slurry, spraying the slurry onto the substrate, etc. A washcoat is typically applied to a substrate as a water-based slurry. Typically, the slurry will contain a total water content of at least 20 wt. %. Water contents of at least 30 wt. %, at least 40 wt. %, at least 50 wt. % or at least 60 wt. %, can also be used. The slurry coated substrate can be dried and calcined prior to use. The temperatures and times used in calcination depend upon the components in the material to be calcined and generally are between about 400° C. to about 900° C. In applications involving the processes described herein, calcinations are generally performed at temperatures from about 500° C. to about 700° C. for about 2 to about 6 hours.

The support for the catalyst can be kneaded along with other components such as fillers, binders, and reinforcing agents, into an extrudable paste which is then extruded through a die to form a honeycomb brick. Before or after the honeycomb brick is dried and/or calcined, the metal components of the SCR catalyst and/or the NOx adsorber catalyst can be added to either one or more portions of the brick or to the entire brick in order to form the catalyst. In other embodiments, the SCR catalyst and/or the NOx adsorber catalyst can be incorporated into the extrudable paste prior to extrusion. When an extruded material comprises the NOx adsorber catalyst, the SCR catalyst can then be applied as a coating on the extruded brick containing the NOx adsorber catalyst, preferably with the SCR catalyst positioned one the extruded brick upstream of the gas flow. When an extruded material comprises the SCR catalyst, the NOx adsorber catalyst can then be applied as a coating on the extruded brick containing the NOx adsorber catalyst, preferably with the NOx adsorbed catalyst positioned one the extruded brick downstream of the gas flow. Both the SCR catalyst and the NOx adsorber catalyst can be mixed together within the extruded brick.

In certain embodiments, the washcoat or impregnation loading on and/or within the substrate for each layer or for the combination of two or more layers is about 0.1 g/in$^3$ to about 8 g/in$^3$, more preferably about 0.5 g/in$^3$ to about 6 g/in$^3$, and even more preferably about 1 g/in$^3$ to about 4 g/in$^3$. In certain embodiments, the washcoat or impregnation loading on and/or within the substrate for each layer or for the combination of two or more layers is ≥1.00 g/in$^3$, such as ≥1.2 g/in$^3$, ≥1.5 g/in$^3$, ≥1.7 g/in$^3$ or ≥2.00 g/in$^3$ or for example about 1.5 g/in$^3$ to about 2.5 g/in$^3$.

A catalytic washcoat comprising an SCR catalyst, a NOx adsorber catalyst and at least one binder, wherein the SCR catalyst comprises a metal selected from the group consisting of cerium, chromium, cobalt, copper, gallium, indium, iridium, iron, manganese, molybdenum, nickel, palladium, platinum, ruthenium, rhenium, silver, tin and zinc; the NOx adsorber catalyst comprises a molecular sieve and a metal selected from the group consisting of cerium, cobalt, iron, lanthanum, manganese, molybdenum, niobium, palladium, tungsten, silver and zinc, the metal in the SCR catalyst and the metal in the NOx adsorbed catalysts are different metals, and the at least one binder is selected from the group consisting of alumina, silica, non-zeolite silica-alumina, natural clay, $TiO_2$, $ZrO_2$ and $SnO_2$.

An ammonia slip catalyst can comprise an inlet zone and an outlet zone, wherein an SCR catalyst as described above is positioned within the inlet zone and a NOx adsorber catalyst comprising a metal-containing molecular sieve as described above, is positioned within the outlet zone.

An ammonia slip catalyst can be produced by a method comprising: (a) forming a bottom layer on a substrate by applying onto a substrate a bottom layer washcoat comprising a NOx adsorber catalyst comprising a metal selected from the group consisting of cerium, cobalt, iron, lanthanum, manganese, molybdenum, niobium, palladium, tungsten, silver and zinc, (b) drying the bottom layer washcoat on the substrate, (c) calcining the bottom layer washcoat on the substrate; (d) forming a top layer positioned over the bottom layer by applying a top layer washcoat comprising an SCR catalyst over the calcined bottom layer formed in step (c), (e) drying the top layer washcoat on the calcined bottom layer on the substrate, and (f) calcining the top layer washcoat on the bottom layer washcoat on the substrate.

An ammonia slip catalyst can also be produced by a method comprising: (a) forming a bottom layer on a substrate by applying onto a substrate a bottom layer washcoat comprising an SCR catalyst, (b) drying the bottom layer washcoat on the substrate, (c) calcining the bottom layer washcoat on the substrate; (d) forming a top layer positioned over the bottom layer by applying a top layer washcoat comprising a NOx adsorber catalyst comprising a metal selected from the group consisting of cerium, cobalt, iron, lanthanum, manganese, molybdenum, niobium, palladium, tungsten, silver and zinc over the calcined bottom layer formed in step (c), (e) drying the top layer washcoat on the calcined bottom layer on the substrate, and (f) calcining the top layer washcoat on the bottom layer washcoat on the substrate.

Exhaust Systems

An exhaust system can comprise (a) a catalyst article comprise an SCR catalyst and a NOx adsorber catalyst, where the SCR catalyst comprises a first metal selected from the group consisting of cerium, chromium, cobalt, copper, gallium, indium, iridium, iron, manganese, molybdenum, nickel, palladium, platinum, ruthenium, rhenium, silver, tin and zinc; the NOx adsorber catalyst comprises a second metal selected from the group consisting of cerium, cobalt, iron, lanthanum, manganese, molybdenum, niobium, palladium, tungsten, silver and zinc, the first metal and the second metal are different metals, and at least one of the SCR catalyst and the NOx adsorber catalyst comprise a molecular sieve and (b) a close coupled catalyzed soot filter (CSF). The exhaust system can further comprise a first means to dose urea into the system before the catalyst article, and a second means to dose urea into the system after the catalyst article.

The exhaust system comprising the first and second means to dose urea can further comprise a means to control the first means to dose urea into the system before the catalyst article, wherein the means to control the first means to dose urea into the system stops or reduces the introduction of urea when the temperature of the catalyst article is at the light off temperature.

An exhaust system can comprise a catalyst article as described above, a passive NOx adsorber trap (PNA) and optionally a diesel oxidation catalyst (DOC), wherein the passive NOx adsorber trap and the optional DOC are positioned upstream of the catalyst article. The exhaust system can further comprise an additional SCR or an SCRF catalyst, where the additional SCR or the SCRF catalyst are positioned downstream of the catalyst article.

An exhaust system can comprise a catalyst article as described above and an additional SCR or an SCRF catalyst, where the additional SCR or the SCRF catalyst are positioned downstream of the catalyst article.

An exhaust system can comprise a catalyst article as described above and a close coupled catalyzed soot filter (CSF), where the catalyzed soot filter is positioned downstream of the catalyst article.

Methods of Treating Exhaust Gas

A method for treating an exhaust gas comprises contacting an exhaust gas stream having a concentration of NOx with a nitrogenous reductant at a temperature of about 150° C. to about 750° C. in the presence of a catalyst article comprising: (a) a wall flow monolith having an inlet face end and an outlet face and an axis of gas flow from said inlet face to said outlet face; (b) a composition comprising a first layer comprising an SCR catalyst and a second layer comprising a NOx adsorber catalyst comprises a metal selected from the group consisting of cerium, cobalt, iron, lanthanum, manganese, molybdenum, niobium, palladium, tungsten, silver and zinc, wherein the first layer is arranged to contact an exhaust gas before the second layer and (c) optionally a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and the second zone is disposed proximal to the outlet face.

A method for reducing the concentration of NOx in an exhaust gas stream during the cold start of the engine comprises contacting an exhaust gas stream containing NOx with a catalyst article comprising an SCR catalyst and a NOx adsorber catalyst, wherein the NOx adsorber catalyst comprises palladium on ceria or a metal-containing molecular sieve, wherein the metal is selected from the group consisting of cerium, chromium, cobalt, copper, iron, lanthanum, manganese, molybdenum, nickel, niobium, palladium, tungsten, silver vanadium, and zinc, and mixtures thereof, wherein stored NOx is reduced by hydrocarbon SCR.

A method for reducing the concentration of NOx in an exhaust gas stream during the cold start of the engine comprises: (a) contacting an exhaust gas stream containing NOx with a catalyst article comprising an SCR catalyst and a NOx adsorber catalyst, wherein the SCR catalyst comprises a metal-containing molecular sieve, wherein the metal is selected from the group consisting of cerium, copper, iron, and manganese, and mixtures thereof, and the NOx adsorber catalyst comprises metal-containing molecular sieve, wherein the metal is selected from the group consisting of palladium or silver, and mixtures thereof, wherein the SCR catalyst and the NOx adsorber catalyst comprise the same molecular sieve and both the metal of the SCR catalyst and the metal of NOx adsorber catalyst are exchanged and/or substituted in the molecular sieve, (b) storing NOx in the catalyst article during cold engine startup, and (c) reducing stored NOx by hydrocarbon SCR.

A method for reducing the concentration of one or more of ammonia, carbon monoxide and hydrocarbons in an exhaust gas stream comprises contacting an exhaust gas stream containing ammonia, carbon monoxide and/or hydrocarbons with an ammonia slip catalyst comprising a first layer comprising an SCR catalyst and a second layer comprising a NOx adsorber catalyst comprising a metal selected from the group consisting of cerium, cobalt, iron, lanthanum, manganese, molybdenum, niobium, palladium, tungsten, silver and zinc, wherein the first layer is arranged to contact an exhaust gas before the second layer. In still another aspect of the invention, a method for reducing the concentration of one or more of ammonia, carbon monoxide and hydrocarbons in an exhaust gas stream comprises the step described above, except that the orientation of the first and second layers are such that the second layer is arranged to contact an exhaust gas before the first layer.

A method for reducing at least one of ammonia, NOx, CO and hydrocarbons in an exhaust gas comprises contacting the gas with a catalyst article comprising: (a) a wall flow monolith having an inlet face end and an outlet face and an axis of gas flow from said inlet face to said outlet face; (b) a first layer comprising a first SCR catalyst and a second layer comprising a NOx adsorber catalyst comprising a metal selected from the group consisting of cerium, cobalt, iron, lanthanum, manganese, molybdenum, niobium, palladium, tungsten, silver and zinc, wherein the first layer is arranged to contact an exhaust gas before the second layer and optionally, (c) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and the second zone is disposed proximal to the outlet face for a time and temperature sufficient to reduce the level of at least one of NOx, CO and hydrocarbons in the gas. In still another aspect of the invention, a method for reducing the concentration of one or more of ammonia, carbon monoxide and hydrocarbons in an exhaust gas stream comprises the step described above, except that the orientation of the first and second layers are such that the second layer is arranged to contact an exhaust gas before the first layer.

A method for reducing the concentration of at least one of ammonia, NOx, CO and THC in an exhaust gas stream generated by a combustion source comprises contacting an exhaust gas stream containing ammonia, NOx, CO and THC with a catalyst article as described above for a time and temperature sufficient to reduce the level of at least one of ammonia, NOx, CO and THC in the gas. Preferably, the catalyst article comprises a first layer comprising an SCR catalyst and a second layer comprising a NOX adsorber catalyst, wherein the NOx adsorber catalyst comprises a metal-containing molecular sieve wherein the metal is selected from the group consisting of cerium, cobalt, iron, lanthanum, manganese, molybdenum, niobium, palladium, tungsten, silver and zinc, and the first layer is arranged to contact an exhaust gas before the second layer.

A method for reducing the concentration of NOx in an exhaust gas stream generated by a combustion source during the cold start of the engine comprises contacting an exhaust gas stream containing NOx with a catalyst article as described above, wherein stored NOx is reduced by hydrocarbon SCR.

Configurations of SCR and $NO_X$ Adsorber Catalysts

Figure 2A:
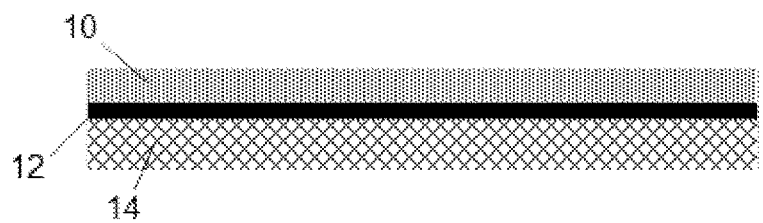
FIGS. 2A-2G are drawings of configurations of catalyst articles showing locations of the SCR catalyst and the NOx adsorber catalyst.

The SCR catalyst and the NOx adsorber catalyst can be present in a variety of configurations. FIGS. 2A-G, which show various configurations, are not to scale. FIG. 2A shows a configuration of an article in which the SCR catalyst is present in a top layer (overlayer) 10 positioned over the NOx adsorber catalyst in a bottom layer (underlayer) 12, where the underlayer 12 is located on a solid support 14. In a variant of this configuration, the NOx adsorber catalyst is present in a top layer (overlayer) 10 positioned over the SCR catalyst in a bottom layer (underlayer) 12.

Figure 2B:
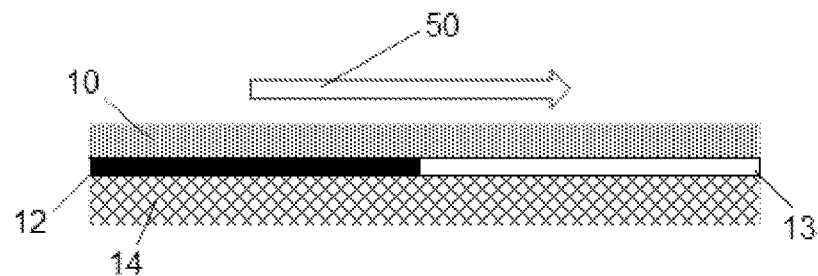

FIG. 2B shows a configuration in which an SCR catalyst is present in an overlayer 10 over two adjacent underlayers 12 and 13, where at least one of the underlayers comprises a NOx adsorber catalyst. The other underlayer can comprise an SCR catalyst, a NOx adsorber catalyst, another type of catalyst or a washcoat containing a support. Both of the underlayers can comprise a NOx adsorber catalyst where the NOx adsorber catalysts are preferably different. The direction of the exhaust gas flow is shown in item 50. Underlayers 12 and 13 are located on a solid support 14. In a variant of this configuration, the NOx adsorber catalyst is present in a top layer (overlayer) 10 positioned over the SCR catalyst in a bottom layer (underlayer) 12 and/or 13.

Figure 2C:
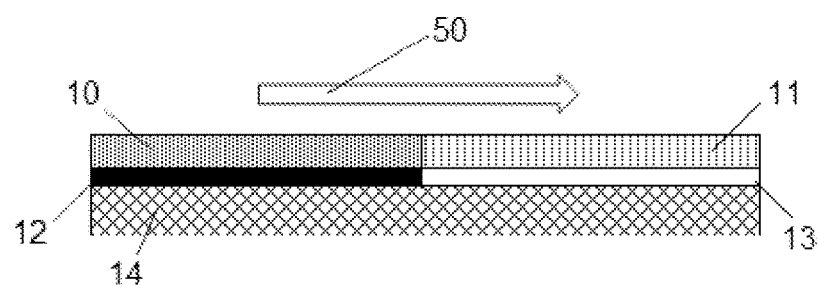

FIG. 2C shows a configuration in which a first SCR catalyst is present in a first overlayer 10 over a first underlayer 12 which comprises a first NOx adsorber catalyst, and a second SCR catalyst is present in a second overlayer 11 over a second underlayer (13) which comprises a second NOx adsorber catalyst, and the first SCR catalyst is located upstream of the second SCR catalyst. The direction of the exhaust gas flow is shown in item 50. Underlayers 12 and 13 are located on a solid support 14.

Figure 2D:
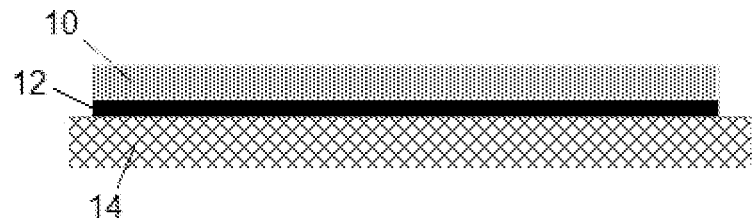
Figure 2E:
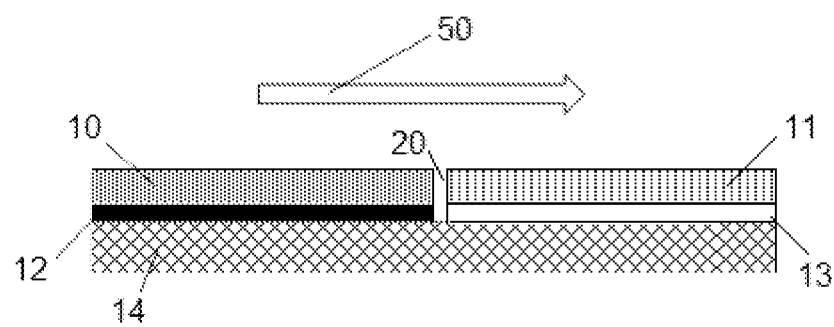
Figure 2F:
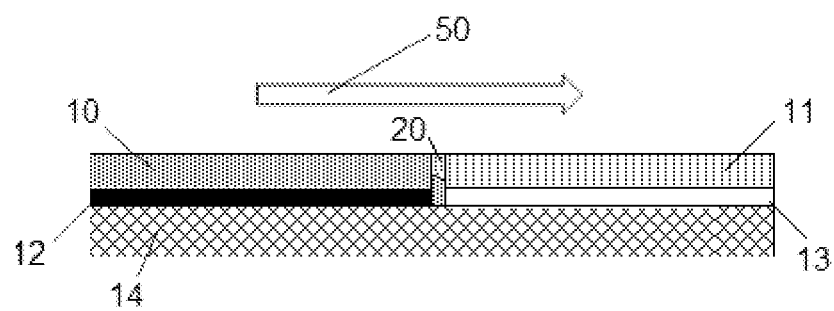
Figure 2G:
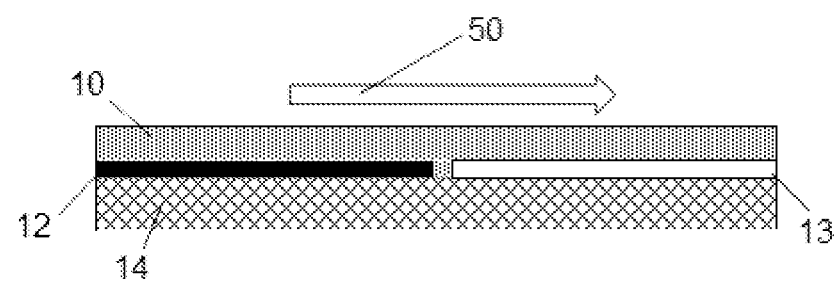

FIG. 2D shows a configuration in which the SCR layer 10 comprising the SCR catalyst is positioned over the underlayer 12 which comprises a NOx adsorber catalyst, and the underlayer 12 is positioned over the solid substrate 14. In FIG. 1A, both the SCR layer and the underlayer comprising a NOx adsorber catalyst are positioned over the entire axial length of the substrate. The SCR layer 10 and the underlayer 12 which comprises a NOx adsorber catalyst can be positioned over a portion of the axial length of the substrate, as shown in FIGS. 2D and 2E. In placing the SCR layer over the underlayer 12 which comprises a NOx adsorber catalyst, a portion of the SCR washcoat can occupy some or all of the space between adjacent underlayers. FIG. 2F shows where all of the space between adjacent underlayers comprises one or more SCR catalyst. The space between adjacent underlayers can be completely filed with an SCR overlay that also fills the space between the underlayers, as shown in FIG. 2G. Generally, a catalyst layer of the present invention permeates the substrate; penetrates a portion of the substrate, for example a majority portion; coats the surface of the substrate; or a combination thereof. Alternatively to being coated on a substrate wall, a catalyst can be incorporated into a high porosity substrate, for example as an interior coating that permeates the wall or can be incorporated into extrudable paste which forms the substrate.

The following examples merely illustrate the invention; the skilled person will recognize many variations that are within the spirit of the invention and scope of the claims.

EXAMPLES

Example 1. Powder Samples with Fixed Pd of 1 wt % and Varying Cu Loading on CHA

A series of catalysts comprising copper and/or palladium containing aluminosilicate chabazites (CHA with a SAR ratio of 25) were prepared by incipient wetness impregnation using copper acetate and palladium nitrate solutions, with copper and palladium loadings shown in the table below. Comparative Catalysts 6 and 7 were each a single component only comprising Pd CHA or Cu CHA, respectively.

|  | One Component |
|---|---|
| Comparative Catalyst 6: | 1 wt. % Pd CHA |
| Comparative Catalyst 7: | 2.5 wt. % Cu CHA |

Each of Catalysts 8-12 below had two components, with the first component comprising Cu CHA in the amounts indicated below and the second component comprising 1 wt. % Pd. The Cu component was first impregnated on the chabazite and calcined before the impregnation of the given concentration of the Pd component. After drying at 100° C., the samples are calcined at 500° C. The samples were then hydrothermally aged at 750° C. in an air atmosphere containing 10% $H_2O$.

|  | First Component with fixed Pd at 1 wt % |
|---|---|
| Catalyst 8 | 0.5 wt. % Cu CHA |
| Catalyst 9 | 1.0 wt. % Cu CHA |
| Catalyst 10 | 1.5 wt. % Cu CHA |
| Catalyst 11 | 2.5 wt. % Cu CHA |
| Catalyst 12 | 3.3 wt. % Cu CHA |

Passive NOx adsorption (PNA) activity of these catalysts was evaluated in a gas mixture containing 200 ppm NO, 200 ppm CO, 50 ppm $C_{10}H_{22}$, 12% $O_2$, 5% $CO_2$ and 5% $H_2O$, with the remainder of the gas being nitrogen, using 0.4 grams of the powder catalyst sieved between 250<d<355 microns and a volumetric gas flow rate of 2 liters per minute at a MHSV of 300 L*$hr^{-1}$*$g^{-1}$. The system was at an initial temperature of 100° C. During the test, the gas mixture was diverted from the catalyst for the first minute before being switched through the sample for 2 minutes at that temperature. This adsorption stage is followed by Temperature Programmed Desorption (TPD) at a ramping rate of 10° C./minute in the presence of the NO-containing gas until the bed temperature reaches about 400° C. in order to purge the catalyst of all stored NOx for further testing. The amount of NOx present in the gas was quantitated using Fourier transform infrared (FTIR) spectroscopy.

Figure 3:
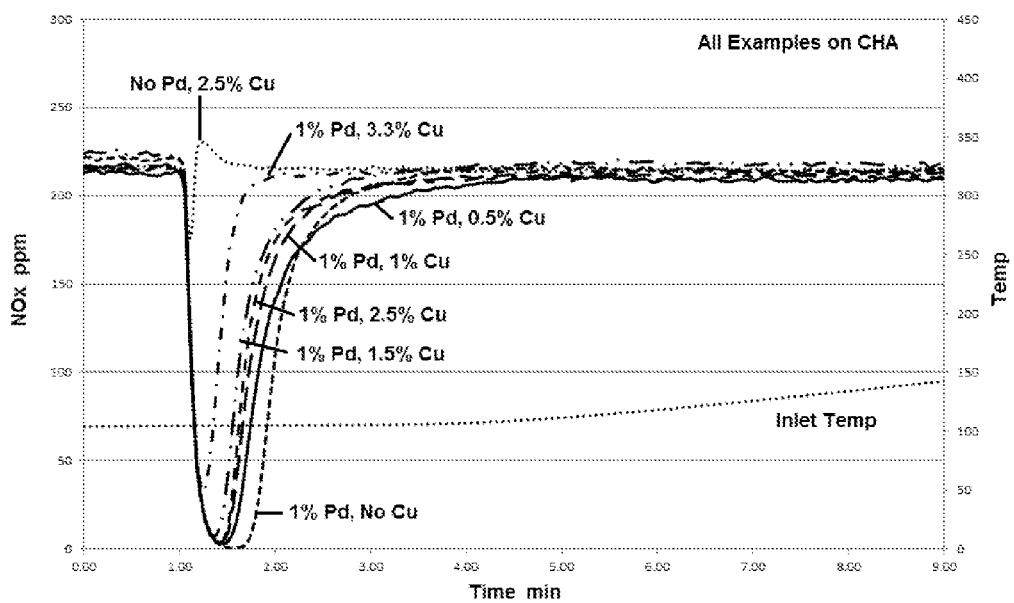
FIG. 3 is a graph illustrating NOx conversion using compositions of Comparative Examples 1 and 2 and Examples 3-5.
Figure 4:
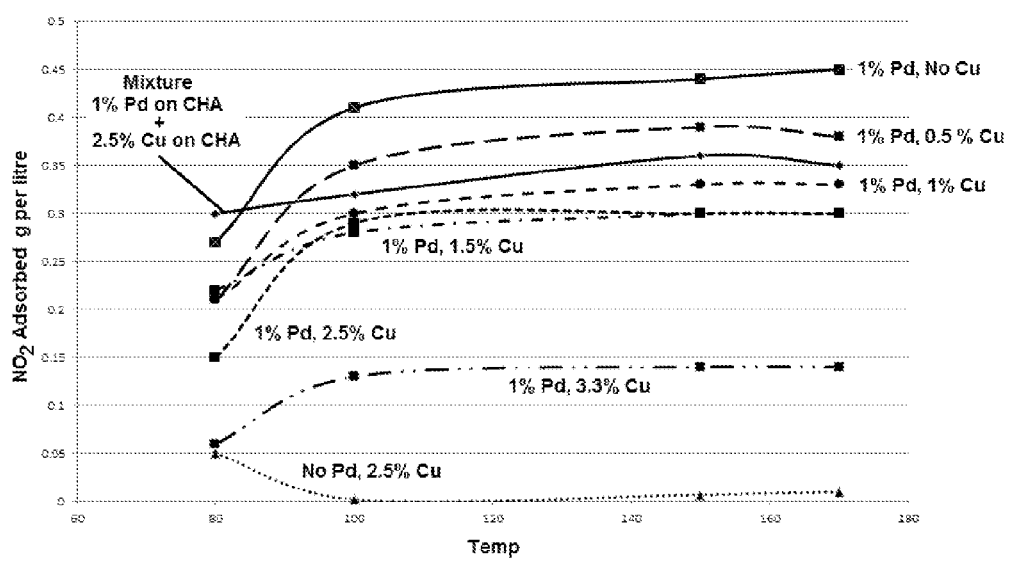
FIG. 4 is a graph showing the amount of $NO_2$ adsorbed, in g per liter, at different temperatures from catalysts having different amount of copper and 1% Pd dispersed on CHA after aging at 750° C.

FIG. 3 shows the amount of NOx present in the gas as a function of time. The graph shows a reduction in the concentration of NOx from about 1 minute to about 2 to 3 minutes. The greater the decrease in the NOx concentration and the length of time of the decrease, the higher the amount of NOx adsorbed. The catalyst without Pd had the least NOx adsorption. The amount of NOx adsorption in catalysts containing 1% Pd increased as the amount of Cu decreased. The catalyst having only 1% Pd without any Cu provided the most NOx adsorption over the first about 2 minutes. However, most of the Pd—Cu/CHA catalysts, with Cu loading less than 3.3 wt % Cu show a high affinity for adsorbing NO$_X$. The NO$_X$ adsorption measurements were repeated at temperatures of 80° C., 150° C. and 170° C. and the NO$_x$ capacity at these temperatures were calculated. The NO$_x$ storage was calculated as the amount of NO$_2$ stored per liter of catalyst with reference to a monolith containing a catalyst loading of 3 g/in$^3$. FIG. 4 shows the effect of temperature on the amount of NO$_2$ adsorbed, in g per liter. The amounts of NO$_2$ adsorbed were relatively constant from 100° C. to 170° C. Comparative Catalyst 6, having only one component which contained 1 wt. % Pd CHA, provided the highest amount of NO$_2$ adsorption at temperatures from 80° C. to 170° C. (0.4 to 0.45 g per liter). The amount of NO$_2$ adsorbed decreased as the amount of copper increased, in the catalysts containing 1% Pd, but most of these mixed component catalysts has high NO$_X$ storage capacity with Cu loading less than 3.3 wt %. However, Comparative Catalyst 7, having only one component which contained 2.5 wt. % Cu CHA, provided the least amount of NO$_2$ adsorption (≤0.01 g per liter). The results show that Pd is critical for the NO$_X$ storage function.

Figure 5:
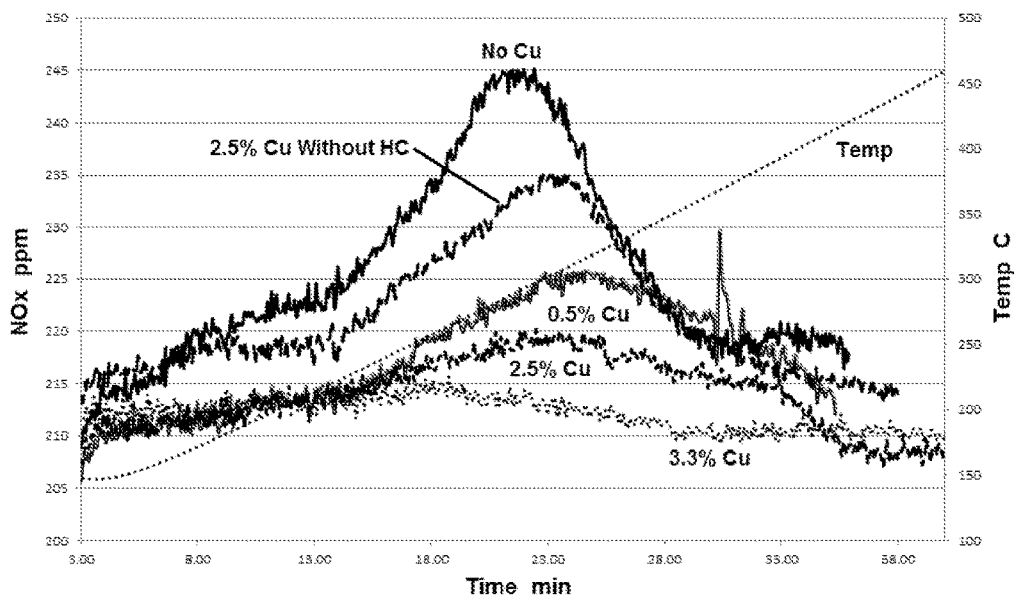
FIG. 5 is a graph showing the NOx release during TPD from catalysts having different amount of Cu and 1% Pd dispersed on CHA after ageing at 750° C. and NO storage at 150° C.

The NOX release profiles during the TPD for Comparative Catalyst 6 and Catalysts 8, 11 and 12 after storage at an initial temperature of 150° C. and then ramping the temperature at a rate of 10° C. per minute are shown in FIG. 5. Catalyst 12 was also evaluated using the same gas mixture during the storage phase but without any hydrocarbon present during the TPD.

Comparative Catalyst 6, having only one layer which contained 1 wt. % Pd CHA, provided the highest amount of NOx release. The amount of NOx released decreased as the amount of copper increased in these catalysts which contained 1% Pd, which partly agrees with the amount of NO$_x$ stored during the storage phase, as shown in FIG. 4. It appears that in the presence of Cu, the amount of released NO$_X$ is lower than the amount stored. This could be due to some of the released NOx being reduced by HC-SCR in the presence of Cu. This was demonstrated for the 1% Pd-CHA catalyst containing 2.5% Cu which was also evaluated without the hydrocarbon in the gas mixture during the TPD. Significantly more NOx was released in the absence of HC, with maximum concentrations of about 220 and 235 ppm with and without HC, respectively.

Figure 6:
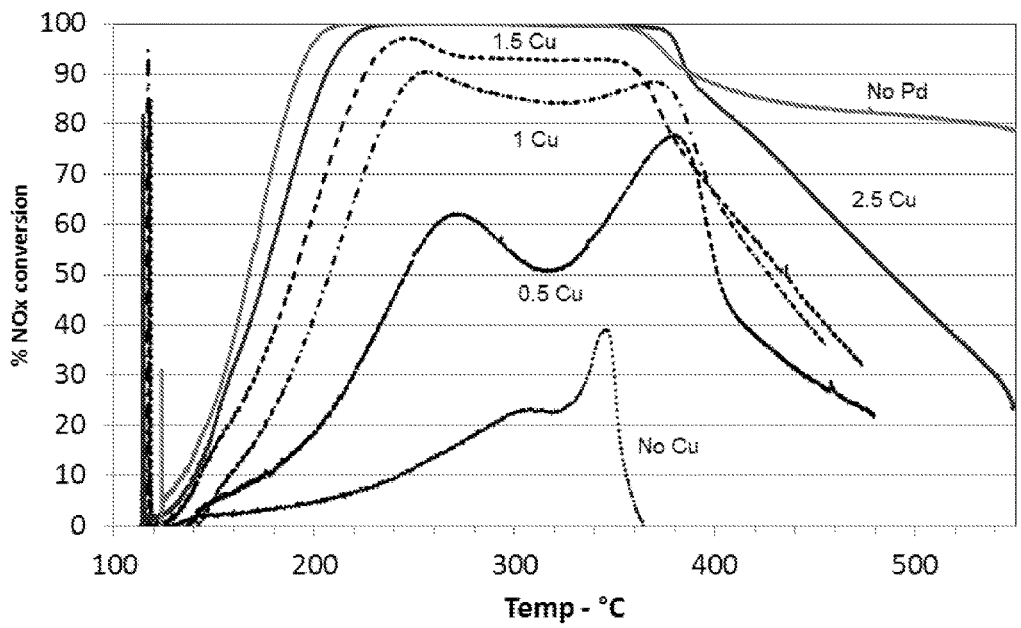
FIG. 6 is a graph showing the effect of temperature on the % NOx conversion from catalysts having different amount of copper and 1% Pd dispersed on CHA after ageing at 750° C. during the $NH_3$ SCR reaction.

The NH$_3$ SCR activities of these hydrothermally aged catalysts containing 1 wt. % Pd and varying amount of Cu were also evaluated in a gas mixture containing 500 ppm NO, 500 ppm NH$_3$, 5% CO$_2$, 5% H$_2$O, 300 ppm CO, 200 ppm C$_3$H$_6$ and 12% O$_2$ flowing at 2 liters per minute at a MHSV of 300 L*hr$^{-1}$*g$^{-1}$. The temperature of the sample was ramped up at 5° C. per minute in the gas mixture from 150° C. to 550° C. FIG. 6 shows the effect of temperature on the % NOx conversion of catalysts having different Cu loadings. The Pd only catalyst without the presence of Cu has low activity for the SCR reaction. The reactivity's of these catalysts for the selective reduction of NO$_X$ by NH$_3$ increases with Cu loading and catalysts containing more than 1 wt. % Cu showing high SCR activities. These results demonstrate the importance of Cu as the active SCR catalyst.

These tests demonstrate that the combination of Cu CHA component with a Pd component is not only active for passive NOx adsorption at low temperature, but can also be active and selective for NOx conversion by the NH$_3$ SCR reaction. A further benefit of such a mixed system is that HC in the exhaust gas can be used in the NOx conversion process. A catalyst containing 2.5 wt % Cu and 1 wt. % Pd has the optimum activity for NOx with high NH$_3$ SCR activity.

Example 2. Powder Samples with Fixed Cu Loading and Varying Pd

A series of catalysts comprising copper and/or palladium containing aluminosilicate chabazites (CHA SAR) were prepared as described in Example 2 with a fixed Cu loading of 2.5 wt. % copper and varying palladium loadings between 0.2 wt. % to 1 wt. % shown in the table below. Comparative Catalyst 7, described above, was a single layer comprising a 2.5% Cu CHA. Each of Catalysts 13-15 below had two components, comprising 2.5% Cu CHA with Pd in the amounts indicated below.

| | Second Component with fixed Cu at 2.5 wt. % |
|---|---|
| Catalyst 13 | 0.2 wt. % Pd |
| Catalyst 14 | 0.5 wt. % Pd |
| Catalyst 15 | 1.0 wt. % Pd |

Figure 7:
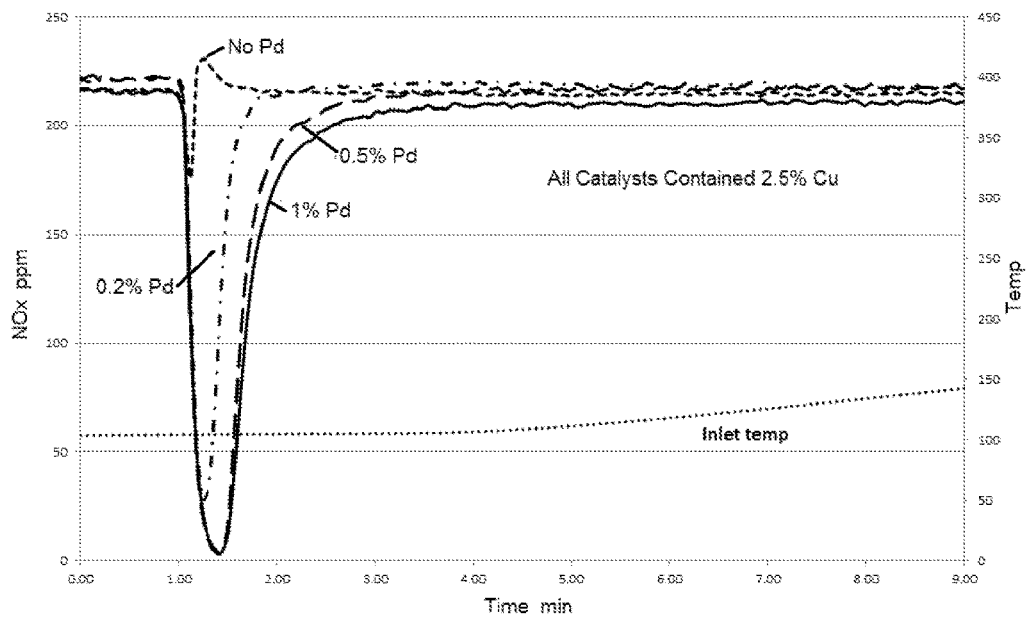
FIG. 7 is a graph showing the NOx concentration from catalysts having 2.5% Cu and different amounts of Pd dispersed on CHA after aging at 750° C.

The samples were analyzed for their PNA and SCR activities as described above in Example 1. FIG. 7 shows the amount of NOx present in the gas over time. The graph shows a reduction in the concentration of NOx from about 1 minute to about 2 minutes. The greater the decrease in the NOx concentration and the length of time of the decrease, the higher the amount of NOx adsorbed. The catalyst without Pd had the least NOx adsorption. The amount of NOx adsorption in catalysts containing 2.5% Cu increased as the amount of Pd increased. This test demonstrates that NOx adsorption can be controlled by adjusting the Pd loading in the catalyst.

Figure 8:
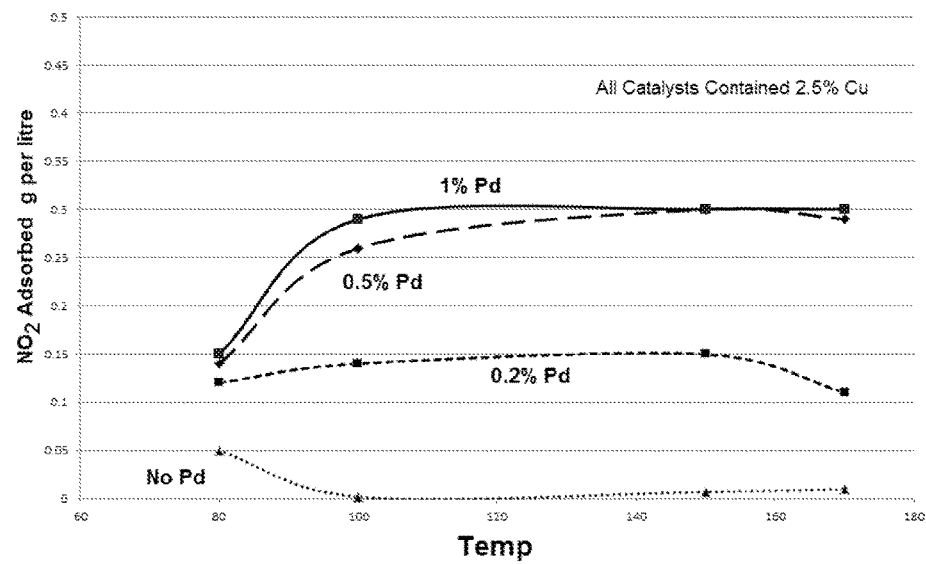
FIG. 8 is a graph showing the amount of $NO_2$ adsorbed, in g per liter, at different temperature from catalysts having 2.5% Cu in the and different amounts of Pd dispersed on CHA after aging at 750° C.

FIG. 8 shows the effect of temperature on the amount of NO$_2$ adsorbed, in g per liter. The amounts of NO$_2$ adsorbed were relatively constant from 100° C. to 170° C. NO$_2$ adsorption on catalysts having 0.5% or 1% Pd was comparable, with amounts from about 0.25 to 0.3 g per liter. The catalysts having 0.2% Pd provided less NO$_2$ adsorption, with amounts from about 0.1 to 0.15 g per liter. Comparative Catalyst 7, having only one component which contained 2.5 wt. % Cu CHA, provided the least amount of NO$_2$ adsorption (≤0.01 g per liter). The results again demonstrate the role of Pd as the NO$_X$ storage component.

Figure 9:
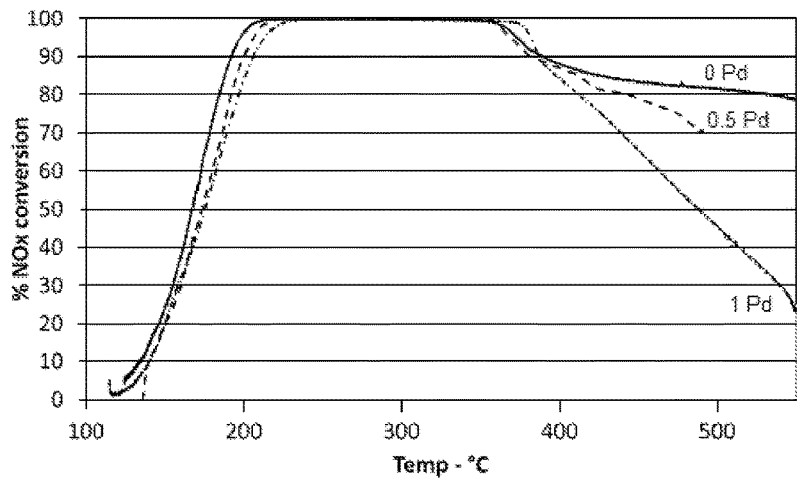
FIG. 9 is a graph showing the effect of temperature on the % NOx conversion from catalysts having 2.5% Cu and different amounts of Pd dispersed on CHA after ageing at 750° C. during $NH_3$ SCR reaction.

The NH3 SCR activities of these hydrothermally aged catalysts containing 2.5 wt % Cu and varying amount of Pd were also evaluated in a gas mixture containing 500 ppm NO, 500 ppm NH$_3$, 5% CO$_2$, 5% H$_2$O, 300 ppm CO, 200 ppm C$_3$H$_6$ and 12% O$_2$ flowing at 2 liters per minute at a MHSV of 300 L*hr$^{-1}$*g$^{-1}$. The sample was ramped up at 5 C per minute in the gas mixture from 150° C. to 550° C. FIG. 9 shows the effect of temperature on the % NOx conversion of catalysts having different Pd loadings with a fixed amount of Cu at 2.5 wt. %. These catalysts show high SCR activities, although the catalyst with the highest Pd loading of 1 wt. % show slight drop in selectivity at high reaction temperature. These results indicate that the Pd NO$_X$ storage component at the described concentration can be combined with the Cu SCR catalyst without significantly affecting its activity and selectivity.

Example 3. Coated Monolith

A series of catalysts comprising copper or palladium containing aluminosilicate chabazites (CHA) having an SAR of 25 were prepared. The Cu loading was 2.5 wt. % and the Pd loading was 1 wt. %. Each of the catalysts was calcined at 500° C. and then milled to a D$_{90}$ of about 5 μm.

The milled samples were then slurried into a washcoat before coating on a monolith substrate with the Pd CHA as the bottom layer and the Cu chabazite as the top layer at the washcoat loadings shown in the table below for catalysts 3-5. Comparative Catalyst 1 was a single layer comprising Cu CHA at a loading of 2.5 wt. % and washcoat loading of 2.5 g $in^3$. Comparative Catalyst 2 was a two layer catalyst with the upper layer comprising Cu CHA at a washcoat loading of 2.5 g $in^3$ and the lower layer comprising ZnO at a loading of 2 g per $in^3$. The samples were then calcined in air at 500° C.

|  | Top Layer | Bottom Layer |
|---|---|---|
| Catalyst 3 | 2.5 g/$in^3$ Cu CHA | 1.5 g/$in^3$ Pd CHA |
| Catalyst 4 | 1.5 g/$in^3$ Cu CHA | 1.5 g/$in^3$ Pd CHA |
| Catalyst 5 | 1.5 g/$in^3$ Cu CHA | 2.5 g/$in^3$ Pd CHA |

Figure 10:
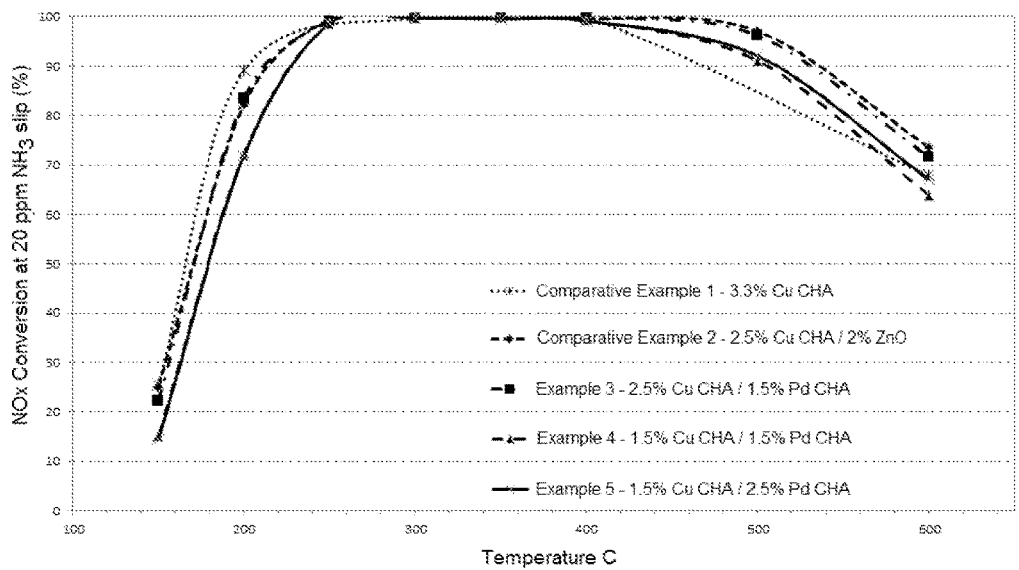
FIG. 10 is a graph illustrating NOx conversion using compositions of Comparative Examples 1 and 2 and Examples 3-5 during the $NH_3$ SCR reaction.

The $NH_3$ SCR activities of these catalysts were measured between 150° C. and 600° C. by passing a gas comprising 500 ppm NO, 750 ppm ammonia, 350 ppm CO, 10% oxygen, 8% $CO_2$, and 5% $H_2O$, with the remainder being nitrogen over the catalyst (60K SV, ANR 1.5) and measuring the amount of NOx and ammonia present before and after exposure to the catalyst. The amount of NOx and ammonia present in the gas was quantitated using Fourier transform infrared (FTIR) spectroscopy. FIG. 10 show the % NOx conversion by each of the catalysts at temperatures from 150° C. to 600° C. The % NOx conversion was similar for all five catalysts, again demonstrating that the presence of the Pd bottom layer was not detrimental to the SCR activity of the Cu-zeolite catalyst.

Figure 11:
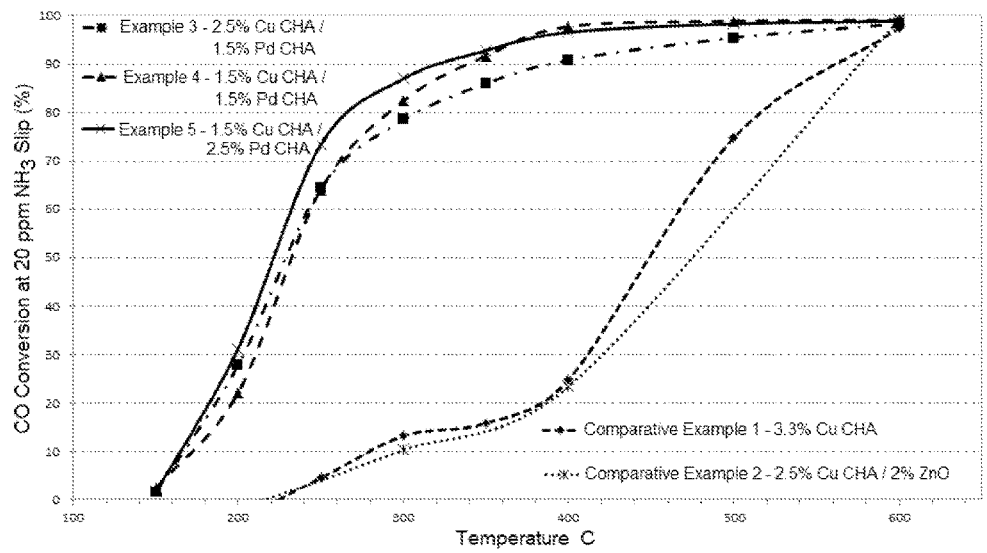
FIG. 11 is a graph illustrating CO conversion using compositions of Comparative Examples 1 and 2 and Examples 3-5.

FIG. 11 shows the % conversion of CO. Each of the catalysts of Example 3-5 provide much greater levels of CO conversion from about 150° C. to about 600° C. For example, at about 220° C., each of the catalysts of Example 3-5 provided for about 50% CO conversion, while Comparative Examples 1 and 2 provided less than about 2% conversion. Example 3-5 provided at least 90% CO conversion from between about 320° C. and 400° C., while comparative Examples 1 and 2 provided only about 10-20% conversion over this temperature range. Therefore, catalysts of Examples 3-5 provide for greatly increased CO conversion over a much wider temperature range than observed using catalysts of Comparative Examples 1 and 2

Example 4. MVEG Test

An MVEG test using a 2.2 L LDD Euro 5 engine was used to compare a currently used DOC+SCRF system to an SCR/PNA+CSF using the catalyst articles described above. In these systems the DOC is a standard Pt—Pd catalyst at PGM loading of 80 2:1 g/$ft^3$ and a washcoat loading of 2.3 g/$in^3$ and the SCRF is a Cu-CHA catalyst with Cu loading 88.6 g/$ft^3$ and washcoat loading 1.9 g/$in^3$. The SCR/PNA system is a layered catalyst similar to example 3 from above, with lower layer PGM loading of 60 g/$ft^3$ and a washcoat loading of 1.0 g/$in^3$ & upper layer Cu loading of 120 g/$ft^3$ and a washcoat loading of 2.4 g/$in^3$. The CSF contains Pt—Pd PGM at a loading of 20 10:1 g/$ft^3$ and has a washcoat loading of 1.5 g/$in^3$. Several of the graphs below show measurements of various parameters made at two locations: as the leave the engine (Engine-Out) and as they leave the catalyst system especially either post SCR/PNA or post SCRF.

Figure 12:
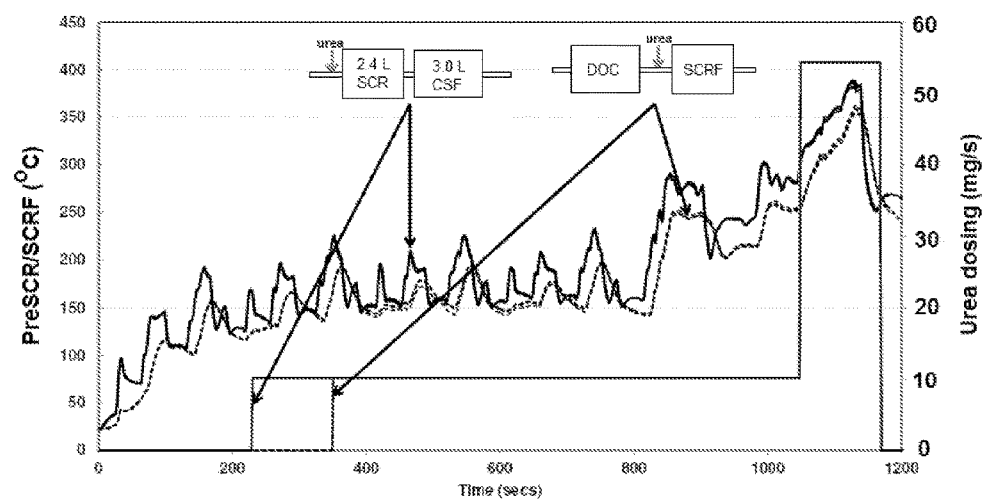
FIG. 12 is a graph illustrating the temperature before the SCR/PNA or the SCRF in a SCR/PNA→CSF or a DOC→SCRF system over time during a MVEG run.

FIG. 12 shows the temperatures before the SCR or the SCRF at various times throughout the test. Temperatures at the SCR/PNA in the SCR/PNA+CSF system were higher than the temperatures at the SCRF in the DOC/SCRF system. The increased temperature at the SCR in the SCR/CSF system allows for earlier reductant dosing compared to the DOC/SCRF system.

Figure 13:
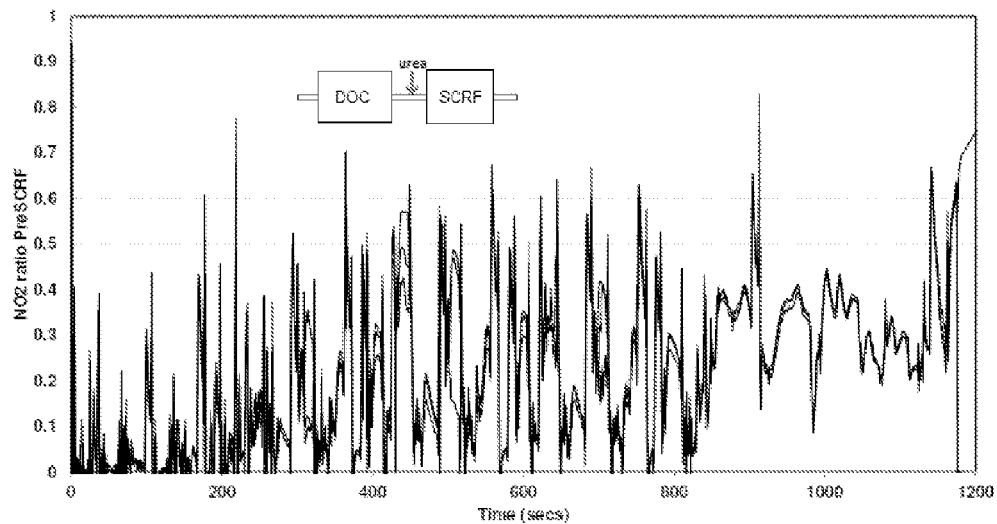
FIG. 13 shows the engine out $NO_2$/NOx ratio (PreSCRF) during the MVEG test in a DOC→SCRF system.
Figure 14:
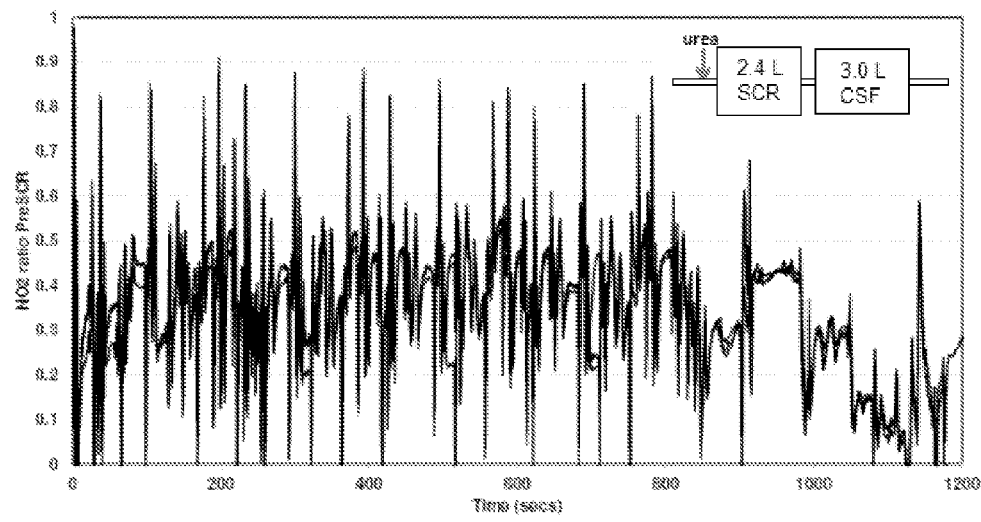
FIG. 14 shows the engine out $NO_2$/NOx ratio (PreSCR/PNA) during the MVEG test in a SCR/PNA→CSF system.

FIGS. 13 and 14 show the preSCRF and preSCR/PNA $NO_2$/NOx ratio during the MVEG test. The SCR/PNA system had a higher $NO_2$/NOx ratio than that in the DOC+SCRF system especially at low temperature in the first part of the test cycle. This could be due to the engine out $NO_2$ being reduced to NO by HC or CO over the DOC in the DOC+SCRF system.

Figure 15:
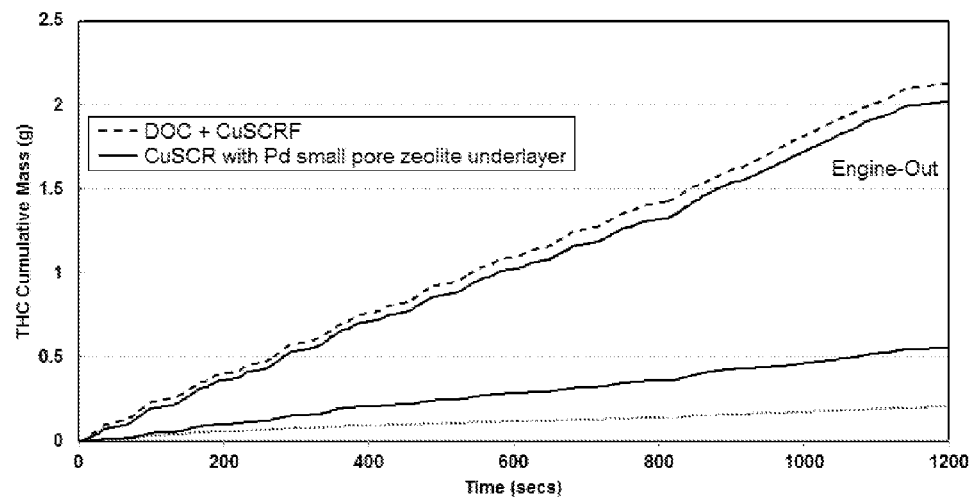
FIG. 15 is a graph illustrating the cumulative total hydrocarbon (THC) mass (g) produced as measured after being released from an engine (engine-out) and after passing through (a) a diesel oxidation catalyst (DOC) plus Cu SCRF or (b) a copper SCR with a palladium small pore zeolite under layer over time during a MVEG run.

FIG. 15 shows the cumulative amount of total hydrocarbon removal by the two systems post SCR/PNA and post DOC–SCRF. The engine produced about 2.2 g of THC during the MVEG test, with the DOC+Cu SCRF system discharging about (0.25 g) of THC, and the SCR/PNA system discharging less than about 1.3 g of THC. As expected the DOC+SCRF had a lower HC emission to the SCR/PNA due to the high activity of the DOC, but in this example the PNA/SCR alone system can remove about 80% of the engine out HC. Further reduction in the HC emission can be achieved on the complete system post CSF.

Figure 16:
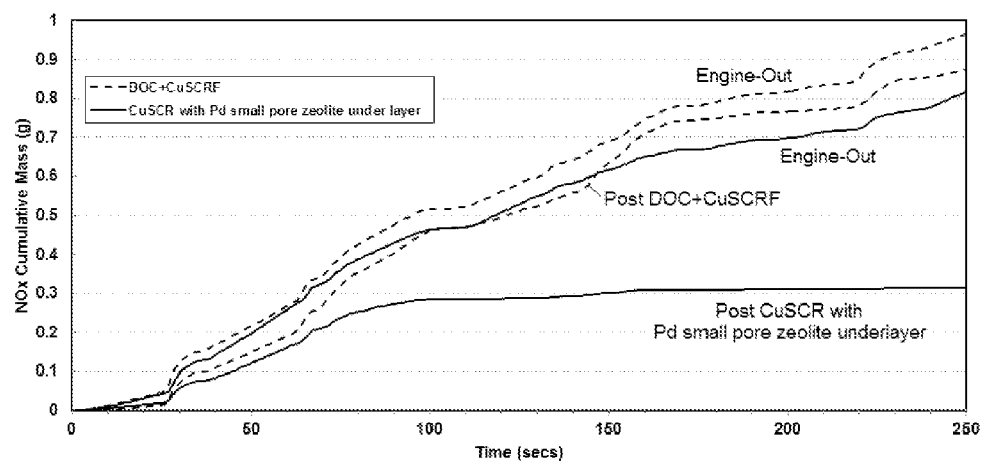
FIG. 16 is a graph illustrating cumulative NOx mass (g) produced as measured after being released from an engine (engine-out) and after passing through (a) a DOC plus Cu SCRF or (b) a copper SCR with a palladium small pore zeolite under layer for the first 250 seconds during a MVEG run.
Figure 18:
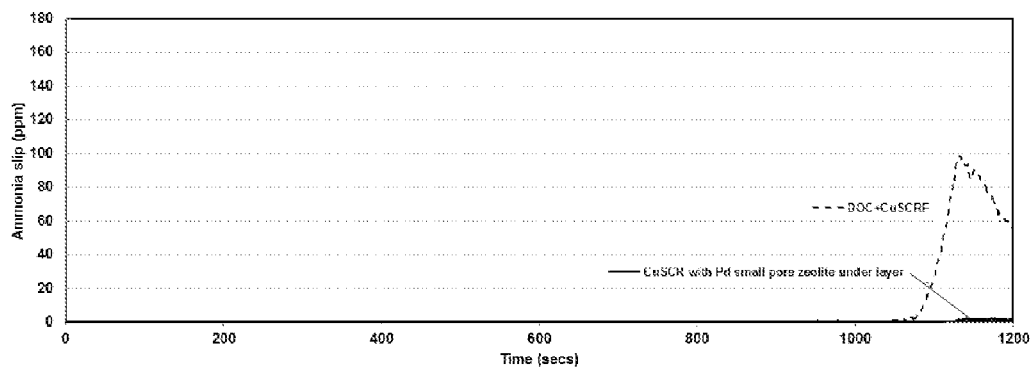
FIG. 18 is a graph illustrating ammonia slip (ppm) after passing through (a) a DOC plus Cu SCRF; or (b) a copper SCR with a palladium small pore zeolite under layer with urea dosing over time during a MVEG run.

FIG. 16 shows the cumulative mass of NOx produced by the engine and $NO_X$ emission post PNA/SCR and DOC+Cu SCRF treatment systems over the first 250 seconds of the MVEG test prior to any urea injection. The DOC+Cu SCRF system had little effect on the cumulative mass of NOx produced during that cold portion of the test cycle. However, the PNA/Cu SCR system with the Pd zeolite underlayer provided greater than a 60% reduction in the cumulative mass of NOx produced over the first 250 seconds in an MVEG test. FIG. 18 shows the $NO_X$ emission post PNA/SCR and DOC+Cu SCRF treatment systems over the complete test cycle with urea injection after 250 seconds.

Figure 17:
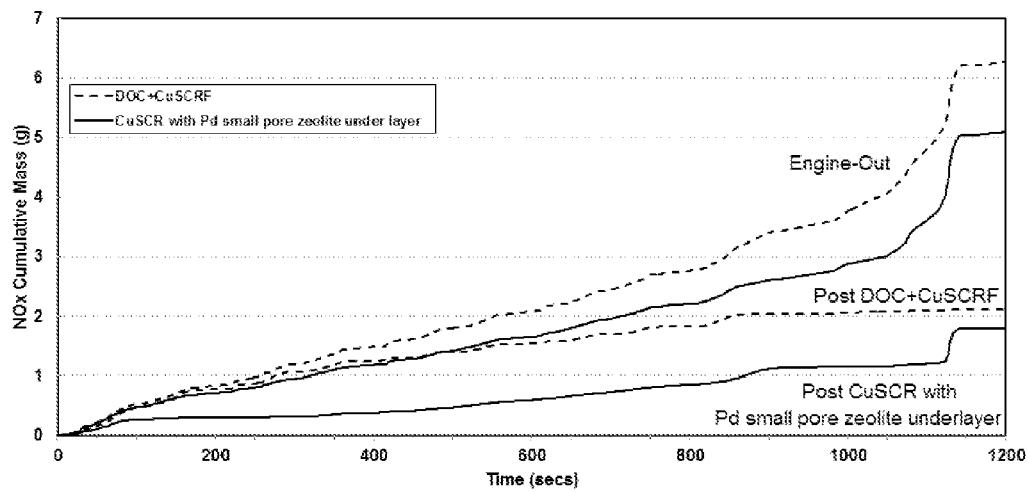
FIG. 17 is a graph illustrating the cumulative NOx mass (g) produced as measured after being released from an engine (engine-out) and after passing through (a) a DOC plus Cu SCRF; or (b) a copper SCR with a palladium small pore zeolite under layer with urea dosing over time during a MVEG run.

FIG. 17 shows the cumulative NOx mass (g) produced as measured after being released from an engine (engine-out) and after passing through (a) a DOC plus Cu SCRF; or (b) a copper SCR with a palladium small pore zeolite under layer with urea dosing over time during a MVEG run.

FIG. 18 shows the amount of ammonia slip using two different catalyst systems. The use of DOC+SCRF provided ammonia slip at a maximum concentration of about 100 ppm. The combination of Cu SCR with a Pd small pore zeolite underlayer reduced the maximum amount of ammonia slip to less than 5 ppm.

Figure 19:
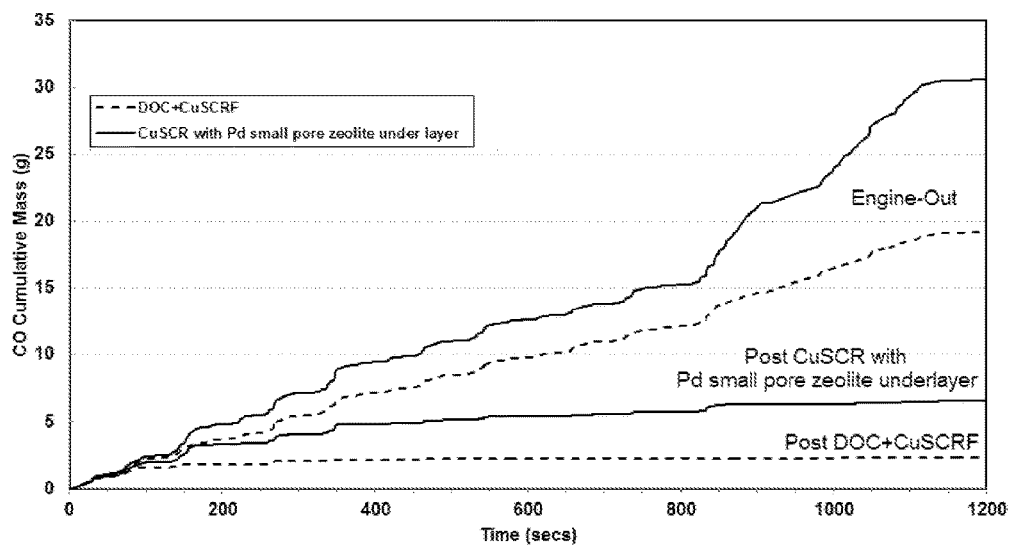
FIG. 19 is a graph illustrating the cumulative carbon monoxide (CO) mass (g) produced as measured after being released from an engine (engine-out) and after passing through (a) a DOC plus Cu SCRF or (b) a copper SCR with a palladium small pore zeolite under layer with urea dosing over time during a MVEG run.

FIG. 19 shows the cumulative mass of CO emission post PNA/SCR and DOC+Cu SCRF treatment systems. The PNA/SCR system can reduce a significant portion of the CO emission but is less effective than the DOC+Cu SCRF. Further reduction in the CO emission can be achieved on the complete system post CSF.

The above figures demonstrate that the catalyst article described herein and an exhaust system containing the exhaust article can:

provide two or more of the following: (a) at least a 50% reduction in the cumulative amount of NOx produced over the first 250 seconds in an MVEG test; (b) at least a 50% reduction in the cumulative amount of NOx produced over the first 1100 seconds in an MVEG test; (c) at least a 75% reduction in the cumulative amount of CO produced over the 1200 seconds of an MVEG test; and (d) at least a 75% reduction in the cumulative amount of THC produced over the 1200 seconds of an MVEG test;

provide three or more of the following: (a) at least a 50% reduction in the cumulative amount of NOx produced over the first 250 seconds in an MVEG test; (b) at least a 50% reduction in the cumulative amount of NOx produced over the first 1100 seconds in an MVEG test; (c) at least a 75% reduction in the cumulative amount of CO produced over the 1200 seconds in an MVEG test; and (d) at least a 75% reduction in the cumulative amount of THC produced over the 1200 seconds of an MVEG test;

provide: (a) at least a 50% reduction in the cumulative amount of NOx produced over the first 250 seconds in an MVEG test; (b) at least a 50% reduction in the cumulative amount of NOx produced over the first 1100 seconds in an MVEG test; (c) at least a 75% reduction in the cumulative amount of CO produced over the 1200 seconds of an MVEG test; and (d) at least a 75% reduction in the cumulative amount of THC produced over the 1200 seconds of an MVEG test;

provide two or more of the following: (a) less than about 0.35 g of NOx produced cumulatively over the first 250 seconds in an MVEG test; (b) less than about 1.3 g of NOx produced cumulatively over the first 1100 seconds in an MVEG test; (c) less than about 7.5 g of CO produced cumulatively over the 1200 seconds in an MVEG test; and (d) less than about 0.6 g of THC produced cumulatively over the 1200 seconds of an MVEG test;

provide three or more of the following: (a) less than about 0.35 g of NOx produced cumulatively over the first 250 seconds in an MVEG test; (b) less than about 1.3 g of NOx produced cumulatively over the first 1100 seconds in an MVEG test; (c) less than about 7.5 g of CO produced cumulatively over the 1200 seconds in an MVEG test; and (d) less than about 0.6 g of THC produced cumulatively over the 1200 seconds of an MVEG test; and provide: (a) less than about 0.35 g of NOx produced cumulatively over the first 250 seconds in an MVEG test; (b) less than about 1.3 g of NOx produced cumulatively over the first 1100 seconds in an MVEG test; (c) less than about 7.5 g of CO produced cumulatively over the 1200 seconds in an MVEG test; and (d) less than about 0.6 g of THC produced cumulatively over the 1200 seconds of an MVEG test, when tested using a 2.2 L LDD Euro 5 engine. The quantity of NOx, HC and CO converted can depend on engine-out conditions.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A catalyst article comprising an SCR catalyst and a NOx adsorber catalyst, wherein the NOx adsorber catalyst comprises palladium on ceria or a metal-containing molecular sieve, wherein the metal is selected from the group consisting of cerium, chromium, cobalt, copper, iron, lanthanum, manganese, molybdenum, nickel, niobium, palladium, tungsten, silver, vanadium, and zinc, and mixtures thereof.

2. The catalyst article of claim 1, wherein the SCR catalyst comprises a base metal, an oxide of a base metal, a molecular sieve, a metal-containing molecular sieve, a metal supported on a mixed oxide or a mixture thereof.

3. The catalyst article of claim 2, wherein the base metal is selected from the group consisting of cerium, chromium, cobalt, copper, iron, manganese, molybdenum, nickel, tungsten, and vanadium, and mixtures thereof.

4. The catalyst article of claim 2, wherein the SCR catalyst comprises a metal-containing molecular sieve where the metal is selected from the group consisting of cerium, chromium, cobalt, copper, gallium, indium, iridium, iron, manganese, molybdenum, nickel, palladium, platinum, ruthenium, rhenium, silver, tin and zinc.

5. The catalyst article of claim 4, wherein the metal in the SCR catalyst comprises copper.

6. The catalyst article of claim 2, wherein the metal supported on a mixed oxide comprises at least one catalytic component consisting of (i) at least one transition metal dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, wherein at least one transition metal is dispersed thereon, wherein the at least one transition metal is selected from the group consisting of a Group VIB metal, a Group IB metal, a Group IVA metal, a Group VB metal, a Group VIIB metal, a Group VIII metal and mixtures of any two or more thereof, provided that at least one selected transition metal is tungsten, and the content of cerium and zirconium as oxides in the catalytic component is $Ce_xZr_{1-x}O_2$, wherein X=0.1-0.5.

7. The catalyst article of claim 2, wherein the SCR catalyst comprises at least one catalytic component consisting of (i) two or more transition metals dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, whereon is dispersed at least two transition metals, provided that at least one of the metals is tungsten.

8. The catalyst article of claim 2, wherein when the molecular sieve in the NOx adsorber catalyst is the same as the molecular sieve in a metal-containing molecular sieve in the SCR catalyst, the metal in the NOx adsorber catalyst and the metal in the SCR catalyst are in combination with the molecular sieve.

9. The catalyst article of claim 2, wherein when the molecular sieve in the NOx adsorber catalyst is different than the molecular sieve in a metal-containing molecular sieve in the SCR catalyst, the metal in the NOx adsorber catalyst is in a first combination with the molecular sieve in the NOx adsorber catalyst, the metal in the SCR catalyst is in a second combination with the molecular sieve in the SCR catalyst and the first combination and the second combination are present in a third combination.

10. The catalyst article of claim 1, wherein the SCR catalyst comprises an aluminosilicate molecular sieve, an aluminophosphate molecular sieve, a silicoaluminophosphate molecular sieve, a metal-containing aluminosilicate molecular sieve, a metal-containing aluminophosphate molecular sieve, or a metal-containing silicoaluminophosphate molecular sieve.

11. The catalyst article of claim 10, wherein the SCR catalyst comprises a molecular sieve or a metal-containing molecular sieve and the molecular sieve or the molecular sieve in the metal-containing molecular sieve comprises erionite or a Framework Type selected from the group consisting of: AEI, BEA (beta zeolites), CHA (Chabazite), FAU (zeolite Y), FER (ferrierite), MFI (ZSM-5) and MOR (mordenite).

12. The catalyst article of claim 1, wherein the molecular sieve in the metal-containing molecular sieve in the NOx adsorber catalyst comprises an aluminosilicate, an aluminophosphate, or a silicoaluminophosphate.

13. The catalyst article of claim 1, wherein the molecular sieve in the metal-containing molecular sieve comprises an aluminosilicate having an SAR from 10 to 100, inclusive, or a silica aluminophosphate comprising between 5% and 15%, inclusive, of silica.

14. The catalyst article of claim 1, wherein the metal in the NOx adsorber catalyst is cobalt, manganese, palladium, or zinc.

15. The catalyst article of claim 1, wherein the metal in the NOx adsorber catalyst comprises palladium or zinc.

16. The catalyst article of claim 1, wherein the metal in the SCR catalyst is copper and the metal in the NOx adsorber catalyst is palladium.

17. The catalyst article of claim 1, wherein (a) when the SCR catalyst comprises a base metal or an oxide thereof, the base metal is present at a concentration of 0.01 to 20 wt. % based on the total weight of the SCR catalyst; or (b) when the SCR catalyst comprises a metal-containing molecular sieve, the metal in the SCR catalyst is present in the molecular sieve at a concentration of 0.01 to 10 wt. %, based on the weight of the molecular sieve.

18. The catalyst article of claim 1, wherein the SCR catalyst is present at a loading of about 0.5 to about 4.0 g/in$^3$.

19. The catalyst article of claim 1, wherein the metal in the NOx adsorber catalyst is present at a concentration of 0.01 to 20 wt. % based on the total weight of the NOx adsorber catalyst.

20. The catalyst article of claim 1, wherein the article comprises:
    (a) a first layer comprising the SCR catalyst and a second layer comprising the NOx adsorber catalyst, or
    (b) a first layer comprising the NOx adsorber catalyst and a second layer comprising the SCR catalyst.

21. The catalyst article of claim 1, wherein the catalyst article comprises an extruded monolith substrate, wherein:
    (a) the extruded substrate comprises the SCR catalyst and the NOx adsorber catalyst is disposed on the extruded substrate as a layer; or
    (b) the extruded substrate comprises the NOx adsorber catalyst and the SCR catalyst is disposed on the extruded substrate as a layer; or
    (c) the extruded substrate comprises the SCR catalyst and the NOx adsorber catalyst.

22. An exhaust system comprising a catalyst article of claim 1, a passive NOx adsorber (PNA) and optionally a diesel oxidation catalyst (DOC) or catalyzed soot filter (CSF), wherein the passive NOx adsorber or the DOC follow the CSF and are positioned upstream of the catalyst article of claim 1 and the article of claim 1 is located on a filter.

23. An exhaust system comprising a catalyst article of claim 1 and a close coupled catalyzed soot filter (CSF) or an SCR on filter (SCRF), where the catalyzed soot filter is positioned downstream of the catalyst article of claim 1.

24. A method for reducing the concentration of NOx in an exhaust gas stream during the cold start of the engine, the method comprising contacting an exhaust gas stream containing NOx with a catalyst article of claim 1, wherein stored NOx is reduced by hydrocarbon SCR.

25. A catalytic washcoat comprising an SCR catalyst, a NOx adsorber catalyst and at least one binder, wherein the SCR catalyst comprises a metal selected from the group consisting of cerium, chromium, cobalt, copper, gallium, indium, iridium, iron, manganese, molybdenum, nickel, palladium, platinum, ruthenium, rhenium, silver, tin and zinc; the NOx adsorber catalyst comprises a molecular sieve and a metal selected from the group consisting of cerium, cobalt, iron, lanthanum, manganese, molybdenum, niobium, palladium, tungsten, silver and zinc, wherein:
    (a) the metal in the SCR catalyst and the metal in the NOx adsorber catalyst are different, or
    (b) the metal in the SCR catalyst and the metal in the NOx adsorber catalyst is the same and either (i) only the NOx adsorber catalyst comprises a molecular sieve, or (ii) the molecular sieve in the SCR catalyst is different than the molecular sieve in the NOx adsorber catalyst, and the at least one binder is selected from the group consisting of alumina, silica, non-zeolite silica-alumina, natural clay, $TiO_2$, $ZrO_2$ and $SnO_2$.

* * * * *